US011161176B2

(12) United States Patent
Jarvis

(10) Patent No.: US 11,161,176 B2
(45) Date of Patent: Nov. 2, 2021

(54) DIAMOND COATING

(71) Applicant: HIPtec AS, Oslo (NO)

(72) Inventor: David Jarvis, Oslo (NO)

(73) Assignee: HIPtec AS, Oslo (NO)

( * ) Notice: Subject to any disclaimer, the term of this patent is extended or adjusted under 35 U.S.C. 154(b) by 0 days.

(21) Appl. No.: 16/772,123

(22) PCT Filed: Dec. 21, 2018

(86) PCT No.: PCT/EP2018/086727
§ 371 (c)(1),
(2) Date: Jun. 11, 2020

(87) PCT Pub. No.: WO2019/122395
PCT Pub. Date: Jun. 27, 2019

(65) Prior Publication Data
US 2020/0376563 A1 Dec. 3, 2020

(30) Foreign Application Priority Data

Dec. 21, 2017 (EP) ..................................... 17209451

(51) Int. Cl.
*B22F 5/10* (2006.01)
*B22F 3/15* (2006.01)
(Continued)

(52) U.S. Cl.
CPC ................ *B22F 5/106* (2013.01); *B22F 3/14* (2013.01); *B22F 3/15* (2013.01); *B22F 5/10* (2013.01);
(Continued)

(58) Field of Classification Search
CPC ...... B22F 5/106; B22F 3/15; B22F 2302/406; B22F 2005/103; C23C 24/082
See application file for complete search history.

(56) References Cited

U.S. PATENT DOCUMENTS 4,992,082 A * 2/1991 Drawl .................... C23C 14/06
51/295
5,803,967 A * 9/1998 Plano ..................... C23C 16/02
117/102
(Continued)

FOREIGN PATENT DOCUMENTS

CA 1171666 A 7/1984
EP 2998049 A1 3/2016
(Continued)

OTHER PUBLICATIONS

European Search Report for EP Application No. 17209451.8 which is the parent application to the instant application, dated Sep. 20, 2018, 14 pages.

(Continued)

*Primary Examiner* — Michael C Miggins
(74) *Attorney, Agent, or Firm* — Harness, Dickey & Pierce, P.L.C.; Anthony G. Fussner

(57) ABSTRACT

A method for coating a metal based component surface wherein said metal based component has an inner and/or outer surface portion that is to be coated, and which surface portion comprises a carbide forming composition. A cavity having one or more cavity walls, wherein said at least one inner and/or outer surface portion forms at least a portion of said one or more cavity walls is provided, and a portion of the cavity is filled with diamond powder. Thereafter gas is removed from the interface between said diamond powder and said at least one inner and/or outer surface portion, and the cavity is subjected to a hot pressing process for a predetermined time at a predetermined pressure and a predetermined temperature such that said diamond powder diffusion bonds to said at least one one inner and/or outer surface portion. Finally at least a part of said diamond powder is removed from said at least one cavity.

19 Claims, 9 Drawing Sheets

(51) Int. Cl.
  *C23C 24/08* (2006.01)
  *B33Y 80/00* (2015.01)
  *B22F 3/14* (2006.01)
  *F16L 9/22* (2006.01)
  *B33Y 10/00* (2015.01)
  *B22F 10/20* (2021.01)

(52) U.S. Cl.
  CPC ............ *B33Y 80/00* (2014.12); *C23C 24/082* (2013.01); *F16L 9/22* (2013.01); *B22F 10/20* (2021.01); *B22F 2005/103* (2013.01); *B22F 2302/406* (2013.01); *B33Y 10/00* (2014.12)

(56) References Cited

U.S. PATENT DOCUMENTS

| | | | | |
|---|---|---|---|---|
| 5,935,323 | A * | 8/1999 | Tanga | C23C 16/0254 |
| | | | | 117/79 |
| 6,451,249 | B1 | 9/2002 | Koizumi et al. | |
| 8,821,603 | B2 * | 9/2014 | Bitler | C22C 26/00 |
| | | | | 51/293 |
| 2008/0115358 | A1 | 5/2008 | Rice et al. | |
| 2009/0226338 | A1 | 9/2009 | Troitski et al. | |
| 2014/0219854 | A1 | 8/2014 | Matsen et al. | |

FOREIGN PATENT DOCUMENTS

| | | |
|---|---|---|
| GB | 2335155 A | 9/1999 |
| WO | WO-2005116298 A1 | 12/2005 |
| WO | WO-2008027905 A2 | 3/2008 |
| WO | WO-2010026079 A1 | 3/2010 |
| WO | WO-2016149196 A2 | 9/2016 |

OTHER PUBLICATIONS

International Search Report and Written Opinion for PCT/EP2018/086727 which is the parent application to the instant application, dated Mar. 14, 2019, 11 pages.

2nd Written Opinion for PCT Application No. PCT/EP2018'0867627 which is the parent application to the instant application, dated Nov. 19, 2019; 11 pages.

PCT International Preliminary Report with amended PCT claims for PCT/EP2018/086727 which is the parent application to the instant application; dated Feb. 27. 2020; 15 pages.

* cited by examiner

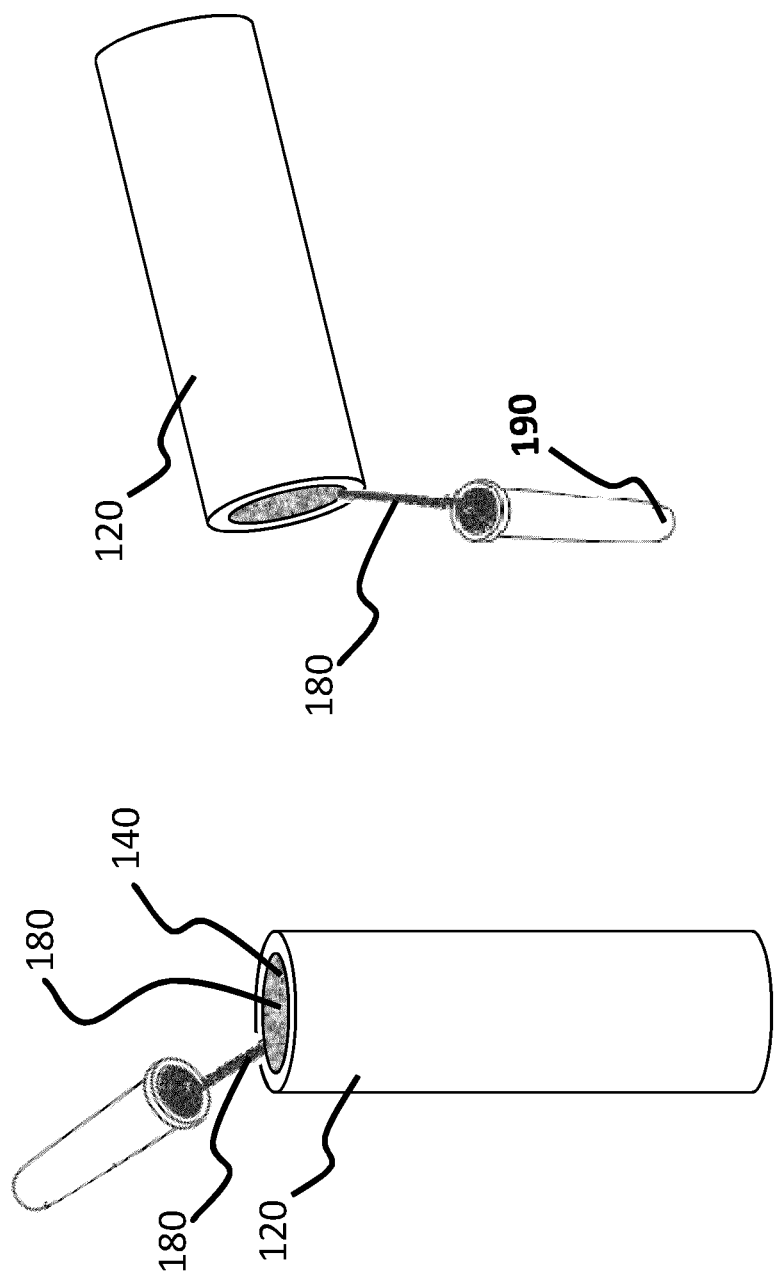

DIAMOND COATING

This patent application is a U.S. national stage filing under 35 U.S.C. § 371 of PCT International Application No. PCT/EP2018/086727 filed Dec. 21, 2018 (published as WO2019/122395 on Jun. 27, 2019), which claims priority to and the benefit of European Application No. 17209451.8 filed Dec. 21, 2017. The entire contents of these applications are incorporated herein by reference.

TECHNICAL FIELD OF THE INVENTION

The present invention relates to a method for diamond coating an inner and/or outer surface of a metal based component and a diamond coated metal based component.

BACKGROUND OF THE INVENTION

Incorporating diamond in the matrix, or as a coating layer of metal based components is utilized quite frequently in different areas of technology, as diamond enhances the hardness of the metal component and/or its surface, improving its robustness. Different deposition methods such as sputtering, atomic layer deposition (ALD), and various chemical vapor deposition (CVD) techniques are used for accomplishing this.

One method for preparing a diamond film on a metal substrate is disclosed in (CN107400874A), where a transition layer is sputtered onto the pretreated stainless steel substrate. However this method and the likes are not typically well suited for coating the inner wall of objects with cavities, or shaped objects in general.

For coating the inner surface of tubular structures, or shaped objects US2012045592A discloses the use of a plasma enhanced chemical vapor deposition technique. At low pressures disclosed in the document, the suitable precursor for depositing the coating layer, is introduced through the holes of a grounded inner electrode. Radio frequency with a specific range is applied through the body of the hollow object/shaped object which is in contact with hollow cathode tube. This leads to deposition of the coating layer on the inside of the hollow object/shaped object.

However, when it comes to industrial dimensions, conventional coating methods of metal components with cavities, or generally speaking, shaped objects with curved inner or outer walls may be time consuming and costly. In addition, if there are sharp angles or edges, forming a uniform coating may prove to be challenging.

Therefore, there is a need to improve the current state of the art in order to overcome or at least alleviate the above mentioned problems related to diamond coating of metal components with cavities, or shaped structures in general.

SUMMARY OF THE INVENTION

An object of the present invention is to provide an improved method for diamond coating the inner and/our outer surfaces of shaped objects and metal components with cavities, which at least partially alleviates the above mentioned drawbacks of the state of the art. This object is accomplished by a method for diamond coating a metal based component wherein one or more cavities are filled with an incompressible coating material provided as diamond powder, as defined in the accompanying claims.

According to the first aspect of the present invention, there is provided a method for coating a metal based component surface said method comprising the steps of:

providing a metal based component having at least one inner and/or outer surface portion that is to be coated, which inner and/or outer surface portion comprises a carbide forming composition throughout said inner and/or outer surface portion;

providing at least one cavity having one or more cavity walls, wherein said at least one inner and/or outer surface portion forms at least a portion of said one or more cavity walls;

filling at least a portion of the at least one cavity with an incompressible coating material comprising diamond powder, such that said inner and/or outer surface portion is exposed to said diamond powder;

removing gas from the interface between said incompressible coating material and said at least one inner and/or outer surface portion;

subjecting said at least partially filled at least one cavity to a hot pressing process for a predetermined time at a predetermined pressure and a predetermined temperature such that said diamond powder diffusion bonds to said at least one one inner and/or outer surface portion;

removing at least a part of said incompressible coating material from said at least one cavity.

According to a first example, said metal based component comprises a cavity and the surface of said cavity is to be fully or partly coated. According to this example, the cavity inside the metal based component is filled with an incompressible filler. The area that is to be coated may e.g. be determined by arranging a carbide forming outer layer only on selected portions of the cavity surface, to which carbide forming outer layer the diamond powder will adhere, additionally or alternatively the diamond powder may be selectively exposed to a carbide forming outer layer of the cavity e.g. by use of a detachable intermediate layer or stencil.

Additionally or alternatively, according to a second example the outer surface of the metal based component is to be fully or partly coated. According to this example the metal based component is arranged inside a canister or receptacle, and the cavity is formed both by the inner surface of said canister or receptacle as well as the outer surface of said metal based component. The cavity is filled with said incompressible filler, so that the surface of said metal based component that is to be coated is exposed to the diamond powder. The area that is to be coated may e.g. be determined by arranging a carbide forming outer layer only on selected portions of the outer surface, to which carbide forming outer layer the diamond powder will adhere, additionally or alternatively the diamond powder may be selectively exposed to a carbide forming outer layer on the outer surface of the metal based component e.g. by use of a detachable intermediate layer or stencil.

Additionally or alternatively, a surface coating of a plurality of separate metal based components may be provided by arranging the plurality of separate metal based components in the same canister. Additionally or alternatively, one metal based component having an inner and/or outer surface which is to be coated may be fully or partly arranged inside a cavity of the another metal based component having an inner and/or outer surface that is to be coated.

Additionally, an inner surface and an outer surface of said metal based component may be partly or fully coated by a combination of said first and second examples. I.e. the metal based component is arranged in a casing or canister as described above, while said metal based component has a cavity, which cavity is filled with incompressible filler material. A selective coating of predetermined areas of the metal based components may be achieved as described in relation to said first and second example.

According to one exemplifying embodiment, the metal based component is a hollow body which inner surface and/or outer surface is to be fully or partly coated, wherein said hollow body is preferably tubular and optionally has an elliptical or rectangular cross-section.

By diamond coating the walls of cavities through filling the cavities with the coating material, and exposing the component to a hot pressing process, intricate geometries and complex voids, such as a cavity having an internally extending geometry with a bent, or a channel having a plurality of bends, may be uniformly coated in a relatively easy manner. This is due to the fact that, unless the dimensions of the openings of the cavities are on the order of or smaller than the provided grain size of the diamond powder filling, the powder can easily be accommodated in said cavities. Moreover, said diamond powder may easily be poured into said one or more cavities, and it may be poured out from said cavities e.g. due to the flowability of said powder. Thus, according to at least one example embodiment, the flowability of said diamond powder allows it to be poured into and out of said one or more cavities.

In addition, since the diamond grains provide for a more or less incompressible property of the diamond powder, as the crystal facets of different diamond particles in the diamond powder are in contact with each other, and thus withstand compression without fracture when being subject to an external load, such as an external load stemming from the hot pressing process, and more specifically, said predetermined pressure during said predetermined time of said hot pressing process, they will not bond together, therefore and according to one example no solid cluster, and/or rough or non-uniform coatings of the surface will form. I.e. according to one example the diamond coating provides a uniform coating of the throughout the surface or surface portion to be coated.

It should be noted that the term "incompressible", refers to the fact that the diamond grains are incompressible, and remain inert relative to one another, before, during, and after the hot pressing process.

It should be understood that the diamond powder is inert in the context of not reacting with itself, i.e. a first diamond particle in the diamond powder will not bond to another diamond particle in the diamond powder during the hot pressing process. This is advantageous so that the diamond powder does not form solid clumps or piece(s) attached and/or unattached to the cavity wall.

According to at least one example embodiment, the diamond powder comprises at least 50%, or at least 60%, or at least 70%, or at least 80%, or at least 90%, such as e.g. at least 95%, or at least 99%, such as e.g. 100 % of diamond particles, said percentage being weight based.

According to at least one example embodiment, said diamond powder comprises at least one of the following materials: zirconia, silicon carbide, tungsten carbide, boron carbide, calcium hexaboride. Such material may be present in the diamond powder such that it corresponds to up to 30%, e.g. between 1% and 25%, or between 5% and 15%, of the weight of the total diamond powder.

Even though the void fraction of diamond powder typically is around 30%, the material characteristics of the diamonds, or the diamond powder characteristics, provide for a more or less incompressible property of the diamond powder, as the crystal facets of different diamond particles in the diamond powder are in contact with each other, and thus withstand compression without fracture when being subject to an external load, such as an external load stemming from the hot pressing process, and more specifically, said predetermined pressure during said predetermined time of said hot pressing process.

It should be understood that the diamond powder is inert in the context of not reacting with itself, i.e. a first diamond particle in the diamond powder will not bond to another diamond particle in the diamond powder during the hot pressing process. However, at least some of the diamond particles which are adjacent a metal surface within the cavity, such as e.g. a surface of a segment, may react and form a metal carbide layer, such as e.g. Iron Carbide, $Fe_3C$, Titanium Carbide, TiC or Tungsten Carbide, WC, depending on the material of the metal surface. Thus, according to at least one example embodiment, the method comprises the step of coating, or forming, internal wall portions, or an internal surface, of said cavity with a metal carbide layer. Hence, said internal wall portions or said internal surface of said metal based component, which internal wall portions or internal surface defines said cavity, is at least partly covered, or is coated, with a metal carbide layer. Such metal carbide layer is typically hard, and thus the internal wall portions of said cavity are more wear-resistant.

According to at least one example embodiment, the carbide forming composition is selected from a group comprising Chromium, Titanium, Tungsten, Molybdenum, or other transitional metals and/or alloys thereof.

The metal based component may consist of said carbide forming composition throughout the component; or the carbide forming composition may constitute an outer layer of said metal based component, whereby the metal based component beneath this outer layer comprises a different material which different material may form the core of the metal based component. This outer layer, may be the outer layer on an inner and/or outer surface of said metal based component. These statements about the carbide forming composition may apply to the whole component throughout its length, or they may apply to a predefined section of the component e.g. the section of the component which is to be coated.

According to at least one example embodiment, an average powder size of said diamond powder is between 1 micron and 1000 microns, preferably between 50 microns and 500 microns.

Such average powder size is suitable for the use of the diamond powder as incompressible filler. Larger powder sizes than 1000 microns are typically impractical and/or too expensive to manufacture, and a smaller powder size than 1 micron are typically impractical or even hazardous to use. Moreover, for powder sizes of between 1 micron and 1000 microns, the diamond powder has flow properties, as described above.

According to one example the average grain size of said diamond powder is at least 1 µm, or at least 10 µm, or at least 20 µm, or at least 30 µm, or at least 50 µm, or at least 80 µm or at least 100 µm. Additionally or alternatively the average grain size of said diamond powder is at most 1000 µm or at most 500 µm, or at most 250 µm, or at most 100 µm, or at most 50 µm, or at most 40 µm.

The diamond particles of said diamond powder may vary greatly in size. For example, and according to at least one example embodiment, the diamond powder may comprise at least two different sets with different average powder sizes, as so called bimodal mixture. For example, a first set of the diamond powder may comprise diamond particles having a relatively small average powder size, such as e.g. between 1 micron and 400 microns, and a second set of the diamond powder may comprise diamond particles having a relatively larger average powder size, such as e.g. between 600 microns and 1000 micron. Hereby, the void fraction of the diamond powder may be reduced, as the relatively smaller diamond particles (i.e. the set of finer diamond powder) will fill the gaps between the relatively larger diamond particles (i.e. the coarser diamond powder). The average powder size between the first set and the second set may e.g. vary by at least a factor of 2. According to at least one example embodiment, further sets with different average powder size may be present in the diamond powder to provide a so called multimodal mixture.

It should be noted that the term "powder size" may be referred to as "particle size", i.e. said average powder size of said diamond powder may be referred to as an average particle size of said diamond powder.

It should be noted that the term "powder size" may be referred to as "particle size", i.e. said average powder size of said diamond powder may be referred to as an average particle size of said diamond powder.

The powder size may be determined by means of sieving and preferably into tight fractions with respect to size, e.g. by using two or more sieves. Such means are known to a person skilled in the art and are commonly referred to as "mesh".

In one example, the powder size has been determined by sieving through two consecutive US mesh sizes 400 and 500 (400/500 US), which yields powder having an average powder size in the range of 25 to 37 microns.

The size of the particles may also be verified using optical methods in a microscope.

According to at least one example embodiment, the diamonds in the diamond powder is artificial, or synthetic diamonds. According to at least one example embodiment, the diamonds in the diamond powder are so called real, or natural diamonds, i.e. they are formed at high temperature and pressure at depths of e.g. 140 to 190 km in the Earth's mantle.

According to at least one example alternative embodiment, the diamond powder is replaced by another incompressible and inert powder, which inert powder is incompressible and inert in relation to the hot pressing process. Such inert powder will typically have the same characteristics as described above for the diamond powder, at least that the facets of different particles in the inert powder are in contact with each other, and thus withstand compression when being subject to an external load, such as an external load stemming from the hot pressing process, and more specifically, said predetermined pressure during said predetermined time of said hot pressing process.

According to at least one example embodiment, said incompressible filler is said diamond powder, i.e. a powder comprising diamonds. In other words, according to such embodiments, the incompressible filler consists solely of diamond powder.

According to at least one example embodiment, said incompressible filler further comprises a solid metal insert, and wherein said step of filling at least said portion of the void with an incompressible filler comprises embedding said solid metal insert in said diamond powder.

Hereby, the amount of diamond powder may be reduced, and said portion of the void may be filled in a more economic and effective manner. Moreover, by embedding the solid metal insert in said diamond powder, bonding of the solid metal insert with another internal metal surface within said stack is avoided. The layer of diamond powder between any internal metal surface of the stack and said solid metal insert may e.g. be at least 0.5 mm, such as e.g. at least 1 mm. It should be noted that the solid metal insert is typically chosen such that it withstands compression during the hot pressing process for said predetermined time at said predetermined pressure and said predetermined temperature. Moreover, the solid metal insert is typically chosen such that it does not melt during the hot pressing process, i.e. that it has a higher melting point than the predetermined temperature used during the hot pressing process.

According to at least one example embodiment, said solid metal insert comprises at least 50% metal. The solid metal insert may be referred to as a solid metal block, or a solid metal element. The solid metal insert is typically at least 10 times as a larger as the average powder size of said diamond powder.

According to at least one example embodiment, said incompressible filler comprises a plurality of solid metal inserts, such as e.g. ball bearings, and wherein said step of filling at least said portion of the void with an incompressible filler comprises embedding said plurality of solid metal inserts in said diamond powder.

According to at least one example alternative embodiment, said incompressible filler comprises a solid insert, and wherein said step of filling at least said portion of the void with an incompressible filler comprises embedding said solid insert in said diamond powder.

Hence, for such embodiments the solid insert needs not to be made out of metal, but is instead made out of another incompressible material, such as e.g. a ceramic material. The solid insert is typically at least 10 times as a larger as the average powder size of said diamond powder.

Thus, according to at least one example embodiment, the incompressible filler consists of diamond powder, or comprises a diamond powder and at least one solid metal insert, or comprises diamond powder and at least one solid insert. Thus, said step of filling at least said portion of the void with an incompressible filler, comprises:

filling said portion with diamond powder, or
filling said portion with diamond powder and said solid metal insert, or with diamond powder and said solid insert, such that said solid metal insert or said solid insert is embedded in said diamond powder.

According to at least one example embodiment, said portion of the void is filled, or almost filled, such as e.g. filled to at least 70% or at least 80% or at least 90% or at least 95% or at least 99%, or filled to a 100% with said incompressible filler. In other words, the void fraction in said portion of the void, subsequently to filling said portion of the void with said incompressible filler, may be e.g. at most 30%, or at most 20%, or at most 10%, or at most 5% or at most 1%, or 0.

According to at least one example embodiment, the method comprises the step of arranging a metal foil inside of said cavity such that said metal foil prevents contact between a an inner or outer surface portion of said metal based component which is not to be coated and said incompressible filler.

Hereby, handling of the incompressible filler may be improved, and for example, for embodiments in which the incompressible filler comprises a powder, such as the diamond powder, the powder will be hindered from undesirably entering any gaps or spaces between segments in a two-segment or multi-segment component. After subjecting said stack to said hot pressing process, the metal foil will typically be comprised in the metal based component as an internal wall of said cavity.

According to at least one example embodiment, the method further comprises the step of at least partly reusing the incompressible filler subsequent to said step of removing the incompressible filler from metal based component.

Hereby, the costs for manufacturing the metal based component having a cavity can be reduced, at the compressible filler may be used in the manufacturing of another metal based component.

According to at least one example embodiment, at least a part, such as e.g. the majority of, or all of, or substantially all of said incompressible filler is reused. According to at least one example embodiment, at least a part, such as e.g. the majority of, or all of, or substantially all of said diamond powder is reused.

According to one exemplifying embodiment, the method comprises the step of perimetrically sealing at least a portion of said cavity from the surroundings (possibly with the exception of a gas evacuating aperture, as explained below). This sealing body may be referred to as a "closing member".

According to at least one example embodiment of the invention, said step of perimetrically sealing at least a portion of said metal based component is done by welding, vacuum brazing, metal brazing, MIG welding, TIG welding, electron beam welding and/or thermitic welding.

According to at least one example embodiment, the perimetrical seal extends over the entire edge portion of said cavity or metal based component.

According to at least one example embodiment, said step of removing gas from the interface between said incompressible coating material and said at least one inner and/or outer surface portion may comprise the sub-steps of:
   providing at least one gas evacuating aperture in metal based component or cavity, which gas evacuating aperture is fluidly connected to said surface that is to be coated;
   evacuating gas from the interface between said incompressible coating material and said at least one inner and/or outer surface portion via said at least one gas evacuating aperture.

Hereby, gas may be removed from said interface between said incompressible filler and the surface to be coated in a relatively straightforward way. Hereby, gas, typically air, can be evacuated from said interface, thus providing a vacuum, or a partial vacuum, within the cavity, hence between the said at least one surface portion exposed to the diamond powder and the diamond grains. Hereby, the bonding or diffusion bonding of said surface portion and diamond grains is realized. Hence, for such embodiments, the gas is removed from said interface to an outside of said cavity by e.g. using a suction device connected to said at least one gas evacuating aperture.

According to at least one example embodiment of the invention, said at least one gas evacuating aperture is arranged in the envelope (i.e. the outer facing surfaces) of said metal based component and/or a canister surrounding said metal based component and/or in said closing member.

According to at least one example embodiment of the invention, the shape of said at least one gas evacuating aperture is circular. Alternatively, the at least one gas escaping aperture may be elliptical or simply be described as having a round shape. The at least one gas evacuating may be described as a gas evacuating hole or as a gas evacuating opening. Yet alternatively, the gas escaping aperture may have the shape of a line, e.g. a groove or a slit, or it may have any regular or irregular form. According to one example embodiment, the gas evacuating aperture may have a predefined form.

According to at least one example embodiment, the method comprises the steps of:
   arranging a gas evacuating crimp tube to said cavity and e.g. said metal based component, wherein an opening of said gas evacuating crimp tube covers said at least one gas evacuating aperture; and
   sealing said gas evacuating crimp tube after the step of evacuating said gas from said interface between said incompressible coating material and said at least one inner and/or outer surface portion and prior to the step of subjecting said stack to a hot pressing process.

It should be understood that the term cover here means that the diameter of the opening of the crimp tube, i.e. the inner diameter of the crimp tube, is larger than the corresponding size of the at least one gas evacuating aperture. In other words, the opening of the crimp tube surrounds the at least one gas evacuating aperture.

Thus, gas may be removed from the interface between said incompressible coating material and said at least one inner and/or outer surface portion by evacuating gas from said cavity via said at least one gas evacuating aperture using said gas evacuating crimp tube. Moreover, the crimp tube may be used to test the degree of vacuum at said interface, e.g. by connecting it to a vacuum pump.

According to at least one example embodiment, the geometry of the cavity, or the shape of the cavity, or a portion of the cavity, is tubular, or straight, or bent, or is complex, e.g. such that it comprises at least two bends.

According to at least one example embodiment, the cavity comprises a portion with a relatively small cross sectional area, and a portion with a relatively large cross sectional area. According to at least one example embodiment, said portion with a relatively large cross sectional area is interposed between two portions having a relatively small cross sectional area. Such geometrical configurations are typically difficult to coat, or coat uniformly with current coating or deposition techniques.

According to at least one example embodiment, wherein the metal component may comprise of a one-piece component, or two-segment component, or a multi segment component before said hot pressing process.

According to at least one example embodiment, an at least one metal insert may be positioned within the said at least one cavity, such that the diamond powder is located between the at least one cavity and the at least one metal insert.

By positioning the metal insert within the cavity, less diamond powder may be required for filling the cavity, as the metal insert may act as a filler.

According to at least one example embodiment, the at least one metal insert can be a metal bar.

According to at least one example embodiment, the temperature range of the hot pressing process may be within a suitable range; said range being preferably within 1000° C.-1300° C. or within 900° C.-1300° C.

This suitable range may be defined by good bonding or diffusion bonding of the diamond grains to the at least one inner and/or outer surface portion that is to be coated on the lower end, and transformation of diamond to graphite on the higher end of the temperature interval.

According to at least one example embodiment, the step of removing at least a part of said incompressible coating material from said at least one cavity may comprise removing at least a part of said diamond powder from said at least one cavity, which is not bonded to said surface portion of said least one or more cavity wall. By this, the excessive diamond grains that are not utilized in the coating process will be removed from the cavity, and may be reused in another process.

According to at least one example embodiment, the average grain size of said diamond powder may be between 1 micron and 250 microns, preferably between 20 microns and 40 microns.

According to at least one example embodiment, the carbide forming composition may be selected from a group comprising Chromium, Titanium, Tungsten, or other transitional metals and/or alloys thereof.

The transitional metals, and therefore their constituting alloys, enhance the adhesion of the diamond grains of the diamond powder to other metal material.

The composition of the inner and or outer surface that is to be coated may consist of said carbide forming material, the carbide forming material may be implemented within the material matrix of the surface to be coated, or be provided as an outmost layer.

According to at least one example embodiment, the carbide forming composition may be provided as an outer layer on said inner and/or outer surface portion. Methods such as electrolytic coating and electroless coating with either aqueous or ionic liquids may be used to deposit said carbide forming layer.

If it is to be provided as a layer, the surface portion which is to be coated of said cavity wall of said metal based component must first be subject to a specific cleaning procedure in order to remove any residues, unwanted particles, and/or fat. This is to guarantee uniform deposition and good adhesion of the deposited carbide forming layer.

According to one aspect of the invention, there is provided a diamond-coated metal-based component wherein said diamond coating comprises at least a first layer and a second layer, said first layer comprises diamond grains, and said second layer comprises a carbide interlayer bonding or diffusion bonding said diamond grains to said metal-based component.

According to at least an example embodiment, said diamond-coated metal-based component comprises a cavity and the whole or at least a part of the surface of said cavity is diamond coated. In other words, said diamond-coated metal-based component comprises a cavity and said diamond coating is fully or partly covering the surface of said cavity. According to at least an example embodiment, at least a portion of said cavity or said diamond coated cavity is tubular, and a cross-section of said tubular cavity surface is optionally elliptical or rectangular. Moreover, the ratio between the length and the diameter of said tubular cavity is e.g. at least 1:5.

According to one aspect of the invention, there is provided coated metal-based component having an inner and/or outer surface wherein at least a portion of said inner and/or outer surface comprises at least a first layer and a second layer, wherein said first layer comprises diamond grains, and said second layer comprises a carbide interlayer bonding or diffusion bonding said diamond grains to said metal-based component. What is stated in this application with respect to the diamond-coated metal-based component, applies also to this coated metal-based component; and vice versa.

According to at least an example embodiment, said inner and/or outer surface additionally comprises a third layer comprising a carbide forming composition; and said carbide interlayer bonds or diffusion bonds said diamond grains to said carbide forming composition.

According to one aspect of the invention, there is provided diamond coated metal-based component having an inner and/or outer surface wherein at least a portion of said inner and/or outer surface comprises at least a first layer and a second layer, wherein said first layer comprises diamond grains, and said second layer comprises a carbide interlayer bonding or diffusion bonding said diamond grains to said metal-based component.

According to at least one example embodiment, wherein through said hot pressing process, said outer surface portion of the at least one metal insert may at least partially be diamond coated.

In this case the metal insert not only may act as a filler, but is itself subjected to diamond coating of at least a surface portion.

According to at least one example embodiment, the carbide forming layer may have a thickness equivalent to the desired thickness of the final diamond coating layer.

According to at least one example embodiment, the thickness of the carbide forming layer, and hence the diamond coating may be determined by the targeted endurance required by the utilization of said metal based component.

According to at least one example embodiment, if said metal based component comprises more than one piece, said more than one pieces of the metal based component may metallurgically bond together through said hot pressing process.

In this case, the metal based components that are to be bonded together may be stacked next to one another in the desired order. During the hot pressing process, gas will be removed from the interfaces between all of said components.

According to the second aspect of the present invention, a coated metal-based component surface, said coating comprising a diamond coating, said coated metal based component comprising at least one cavity having one or more cavity walls, having at least one surface portion, wherein said at least on surface portion defines at least a portion of said one or more cavity walls, where said surface portion comprises the diamond coating, such that the diamond coating is diffusion bonded to said surface portion during a hot pressing process for a predetermined time at a predetermined pressure and a predetermined temperature.

According to at least one example embodiment, said step of arranging said plurality of segments in a stack comprising arranging said segments such that an opening to said void is formed in the envelope of said stack, and wherein said step of filling at least said portion, such as said first portion, of the void with an incompressible filler comprises introducing said incompressible filler to said portion, or said first portion, of the void via at least said opening, said method further comprising the steps of:

closing at least said portion of the void from the surroundings by closing at least a portion of said opening;

opening said cavity of the metal based component to the surroundings prior to removing said incompressible filler from said metal based component.

Hereby, said incompressible filler may easily and efficiently be supplied to at least said portion of the void, and said incompressible filler may easily and efficiently be held in at least said portion of the void during the hot pressing process, in which at least said portion of the void is forming said cavity, and may thus also easily and efficiently be removed from said cavity.

According to at least one example embodiment, said method comprises the step of closing said opening by a closing member, such as e.g. a lid. Said closing member may thus be sealingly connected to a portion of said stack.

According to at least one example embodiment, said step of opening said cavity comprises removing, or penetrating, said closing member.

According to at least one example embodiment, more than one opening is provided in the envelope of said stack, such as e.g. a first opening and a second opening, said second opening being distant from said first opening. For such embodiments, all of the openings are closed prior to subjecting said stack to a hot pressing process.

According to at least one example embodiment, the method comprises the steps of:
- making a 3D model of the desired metal based component;
- discretizing the 3D model into model segments;
- manufacturing the segments in said plurality of segments based on said model segments, wherein each one of the segments in said plurality of segments corresponds to a model segment.

Hereby, an efficient but yet simple way of manufacturing the segments used for manufacturing of the metal based component having a cavity is provided. The step of making a 3D model of the desired metal based component, and the step of discretizing the 3D model into model segments, are typically carried out using a computer or a computer means.

The step of manufacturing the segments may e.g. be carried out using water-jet cutting, laser cutting, milling, sawing or lathing.

According to at least one example embodiment, each one of the segments in the plurality of segments is metal based, e.g. made out of a wrought material, i.e. a metal of a high quality and a high strength, or made out of a cast material. For example, any one of the segments may comprise, or consist of, iron, steel, stainless steel, nickel, aluminum, copper, titanium, magnesium, bronze, stainless steel, super-duplex steel, precious metals e.g. gold or platinum, beryllium, zirconium, cobalt, nitinol, invar or magnesium combinations and/or alloys thereof. The segments may for example be made solely of metal, or be made from a mixture of metal and another type of material. According to at least one example embodiment of the invention, each one of the segments comprises mainly metal. For example, comprises at least 51%, or at least 80%, or at least 90%, or at least 95%, or at least 100% metal.

According to at least one example said metal based component is a two-segment or a multi-segment (i.e. comprising three or more segments) component; i.e. a component comprising at least two segments arranged in contact with each other. According to one example the plurality of segments (i.e. the two or more segments) are stacked on top of each other. By the provision of having metal based segments, the segments will metallurgically bond to each other to form said metal based component during the step of subjecting said stack to a hot pressing process.

According to at least one example embodiment, the material of at least one of the segments is different from the material of at least another segment. Thus, at least one of said segments has different material properties as compared to another one of said segments. Moreover, said step of arranging said plurality of segments in a stack, may comprise arranging said at least one of said segments with a different material to a predetermined location of said stack.

Hereby, specific parts or portions of the metal based component, corresponding to the predetermined location of the at least one segment having different material properties, may be made of a material with different material properties as compared to other parts or portions of the metal based component. Thus, these specific part or portions of the metal based component may be made stronger by using a material with such material properties. Thus, a cost-effective method for strengthening these specific part or portions of the metal based component is provided.

The segment with different material properties as compared to another one of said plurality of segments, may e.g. be comprised of another material, such as another metal, as compared to another one of said plurality of segments.

According to at least one example embodiment, said method further comprises the step of:
- treating at least some of the segments in said plurality of segments by surface treatment such as grinding, lapping, polishing, and/or cleaning, prior to the step of arranging said plurality of segments in a stack.

Thus, the segments in said stack may have been surface treated prior to be subjected to the hot pressing process step. The surface treatment may as stated be e.g. grinding, planar grinding, lapping, polishing, and/or cleaning. It should be noted that coating may according to at least one embodiment be considered to be comprised in general term of "surface treating". However, according to at least yet another embodiment, the coating may be considered to be the act of adding a layer to at least some of the segments, and hence not a treatment of the surface of segments per se. Hence, additionality or alternatively, the method comprises the step of coating at least one of the segments prior to the step of arranging said plurality of segments in said stack.

Grinding, lapping, polishing, cleaning and/or coating of at least some of the segments are done in order to ensure, or at least improve, metallurgical bonding during the hot pressing process step. During grinding, lapping, polishing, cleaning and/or coating step, dirt and/or oxides may be removed from the surface of at least some of the segments, and/or the properties of the at least one surface may be altered, of at least some of the segments. Hereby, direct contact between two facing surfaces of two neighboring segments may be improved.

According to at least one example embodiment, the choice between the techniques grinding, lapping, polishing, cleaning and/or coating is material dependent. In other words, depending on which metal that is used in the plurality of segments, different techniques or different combination of techniques may be used. For example, for a certain kind of metal, only cleaning may be needed or preferred, whereas for another kind of metal, cleaning, polishing and/or coating may be needed, or preferred, in order to ensure, or improve, metallurgical bonding during the hot pressing process step.

According to at least one example embodiment of the invention, when coating is performed, traces or residues of the coating may be visible in the final, or manufactured, metal based component, and therefore the coating may act as a finger print for the method when used.

The segments may e.g. be shaped as sheets or plates, such as e.g. bent sheets or bent plates, or have any other suitable form allowing the segments to be arranged in a stack. For example, the segments may be shaped as in at least one of the following: plates, sheets, foils, forged cubes, discs, or forged discs.

Such shapes of the segments are advantageous compared to e.g. metal powder, as metal powder provides a relatively low packing density, is associated with large shape-changes during the hot pressing process, and may be associated with harmful inhalation during handling of the metal powder. Moreover, plates, sheets, foils, cubes, and discs may be beneficial due to the related relatively high packing density, approximate between 95 and 100%.

According to at least one example embodiment, each one of the segments in the plurality segments, is larger than 5 mm in at least one extension, such as e.g. larger than 5 mm in diameter, or hydraulic diameter.

According to at least one example embodiment of the invention, the predetermined time and the predetermined temperature used during the hot pressing process are within the ranges of what is normally used within the hot pressing industry, e.g. within the HIPping industry. For example, the predetermined time may be within the range of 1 h to 12 h, the predetermined pressure may be within the range of 100 MPa to 200 MPa, and the predetermined temperature may be within the range of 500° C. to 1300° C. The predetermined time, the predetermined pressure and the predetermined temperature may all vary due to a variety of parameters known to the skilled person. For example, they may vary due to the size or the shape of the metal based component which is being coated. Further, they may vary due to the material choice, e.g. which metal(s) is being used for the metal based component.

If there are segments, each one of the plurality of segments may bond metallurgically to at least another segment of said plurality of segments.

According to at least one example embodiment, the hot pressing process is a hot isostatic pressing process, also known as a HIPping process, which is particularly suitable for the coating of the metal based component of the inventive concept. The HIPping process typically involves subjecting a component, to both an elevated temperature and an isostatic gas pressure in a high pressure containment vessel, using for example argon as pressurizing gas.

By using HIPping for coating the metal based component, the porosity in the structure of the metal based component can be further reduced and the density of the structure further increased and the coating may be evenly provided also at corners or edges. Hence, post-treatment of the metal based component may many times be omitted or at least reduced compared to prior art methods. Moreover, and according to at least one example embodiment of the invention, during the HIPping process, portions or parts of the stack are subjected to some lateral shearing. The lateral shearing may act as a surface treatment and remove any residual oxidation layers, or dirt, on the segment, and thereby ensure a good metallurgical bonding.

According to at least one example embodiment, the hot pressing process involves subjecting the component to a uniaxial pressure, e.g. by using a hot pressing equipment and the simultaneous application of heat and pressure, such as e.g. in a diffusing bonding furnace or a vacuum diffusion bonding furnace. Thus, if there are segments they may bond metallurgically to each other at a temperature high enough to induce sintering and creep processes.

It should be noted that for e.g. HIPping, traditionally a can or canister, such as a HIPping can, or a HIPping canister, is filled with a metal powder, prior to subjecting the powder-filled can to the hot pressing. Thus, the metal based component is formed corresponding to what has been previously described, i.e. the metal powder is hot pressed for a predetermined time at a predetermined pressure and a predetermined temperature, and is thus consolidated to the metal based component. By using segments, the drawbacks of using metal powder as a starting material for the manufacturing method, such as e.g. low packing density and the resulting shape change of the final product, are overcome or at least reduced, as the packing density when using segments are superior to using metal powder. Hence, the method according to the invention may be described as a metal powder-free hot pressing (or HIPping) manufacturing method.

According to at least one example alternative embodiment, the hot pressing process is carried out without a can or canister. For such embodiments, the method comprises the step of perimetrically sealing at least a portion of said metal based component from the surroundings (possibly with the exception of a gas evacuating aperture, as explained below).

According to at least one example embodiment of the invention, said step of perimetrically sealing at least a portion of said component is done by welding, vacuum brazing, metal brazing, MIG welding, TIG welding, electron beam welding and/or thermitic welding.

It should be understood that perimetrically sealing at least one portion of said component for example means that an opening of the component is sealed so that the diamond powder may be held therein.

According to at least one example embodiment, the perimetrical seal extends over the entire edge portion for at least one of the metal based sheets.

According to at least one example embodiment, said step of removing gas from said cavity may comprises the sub-steps of:
  providing at least one gas evacuating aperture in a surface surrounding said cavity, which gas evacuating aperture is fluidly connected to the spaces between said diamond powder and said surface portion that is to be coated;
  evacuating gas from said intermediate spaces via said at least one gas evacuating aperture.

Hereby, gas may be removed from said intermediate spaces in said cavity in a relatively straightforward way. Thus, the intermediate spaces are in fluid communication with the at least one inner and/or outer surface of said metal based component. Hereby, gas, typically air, can be evacuated from the component or stack, thus providing a vacuum, or a partial vacuum, between the surfaces of different segments. Hereby, the metallurgically bonding of the diamonds to the component surface and/or the segments to each other is improved. Hence, for such embodiments, the gas is removed from the intermediate spaces between the segments, or between the diamonds and the component surface, to an outside of said stack by e.g. using a suction device connected to said at least one gas evacuating aperture.

According to at least one example embodiment of the invention, said at least one gas evacuating aperture is arranged in the envelope (i.e. the outer facing surfaces) of said cavity and/or in an inwards facing surface of said cavity.

According to at least one example embodiment of the invention, the shape of said at least one gas evacuating aperture is circular. Alternatively, the at least one gas escaping aperture may be elliptical or simply be described as having a round shape. The at least one gas evacuating may be described as a gas evacuating hole or as a gas evacuating opening. Yet alternatively, the gas escaping aperture may have the shape of a line, e.g. a groove or a slit, or it may have any regular or irregular form. According to one example embodiment, the gas evacuating aperture may have a predefined form.

According to at least one example embodiment, the gas evacuating aperture is provided to a sealing or closing member (e.g. to said first or to said second closing member).

According to at least one example embodiment, the method comprises the steps of:

arranging a gas evacuating crimp tube to said stack, wherein an opening of said gas evacuating crimp tube covers said at least one gas evacuating aperture; and sealing said gas evacuating crimp tube after the step of evacuating said gas from said intermediate spaces and prior to the step of subjecting said stack to a hot pressing process.

It should be understood that the term cover here means that the diameter of the opening of the crimp tube, i.e. the inner diameter of the crimp tube, is larger than the corresponding size of the at least one gas evacuating aperture. In other words, the opening of the crimp tube surrounds the at least one gas evacuating aperture.

Thus, gas may be removed from the intermediate spaces by evacuating gas from said intermediate spaces via said at least one gas evacuating aperture using said gas evacuating crimp tube. Moreover, the crimp tube may be used to test the degree of vacuum in the intermediate spaces, e.g. by connecting it to a vacuum pump.

According to at least one alternative example embodiment, said step of removing gas from said intermediate spaces comprises the sub-step of:

providing a chemical substance within at least one of the intermediate spaces, said chemical substance being configured to react with said gas in said intermediate spaces in order to remove said gas.

Hence, for such embodiments, the gas evacuating aperture can be omitted, as the gas within the intermediate spaces may react with said chemical substance in such a way that the gas is removed. It should be noted that the gas may thus be removed by a reaction with the chemical substance forming e.g. a solid material (i.e. not a gas), and/or be removed by absorption and trapping of the gas in the chemical substance.

The chemical substance may e.g. be held in at least one of the intermediate spaces, such as e.g. in a separate portion of one of the intermediate spaces, which separate portion later on can be removed (e.g. machined away) from the metal based component.

According to at least one example embodiment, said chemical substance is a Calcium based compound. For example, said chemical substance comprises at least one of the following substances: Ca, Ti, Zr, Ca—Mg, Ca—Al, Ca—Zn, Ca—Cu, any alloy of the same or any eutectic alloys.

According to at least one example embodiment, said chemical substance is molten, e.g. it may be comprised in a powder which subsequently melts during heating. According to at least one example embodiment, said chemical substance is configured to react with oxygen, nitrogen, hydrogen, water and/or a hydrocarbon.

According to at least one example embodiment, the method comprises the step of heating said chemical substance in order to make it react with said gas in the intermediate spaces. The amount of heating needed is dependent on the chosen chemical substance which is well known to the person skilled in the art.

According to at least one example embodiment, the step of heating said chemical substance is comprised in said step of subjecting said stack to a hot pressing process (e.g. the HIPping process step). Hence, according to such embodiments, the chemical substance will be heated during the initial time of the hot pressing process step.

Stated differently, and according to one example embodiment, the step of removing said gas from said intermediate spaces is a sub-step in said step of subjecting said stack to a hot pressing process.

Regardless of whether a canister is used, or if the component is subject to said perimetrically sealing, the gas between the segments must typically be removed to provide a sufficient metallurgically bonding between the segments. According to at least one example embodiment, in said step of removing gas from said stack, at least 50%, or at least 60%, or at least 70%, or at least 80, or at least 90% of the gas is removed from said cavity or stack compared to prior to the step of removing gas from said cavity or stack. In other words, said step of removing gas from said cavity or stack, may comprise providing a vacuum, or a partial vacuum, in said cavity or stack. Stated differently, said step of removing gas from said cavity or stack, may comprise providing an under-pressure in said cavity or stack.

According to at least one example embodiment, said metal based component is a single unit metal based component.

The coated metal based component may e.g. have an extension in at least one direction of at least 0.05 m, such as e.g. at least 0.1 m. Additionality, or alternatively, the coated metal based component may have an extension in at least another direction of at least 0.3 m or 0.5 m, such as e.g. at least 1 m, such as e.g. at least 2 m, such as e.g. at least 4 m.

According to at least one example embodiment, said method further comprises the step of reshaping, or reducing the size of, the metal based component by removing any undesired portions of the metal based component. Hence, the metal based component may be shaped and sized in a desired manner. Said removing may e.g. be performed by physically removing said portions, e.g. by cutting or machining away said portions. Said removing may alternatively be performed by chemical means, i.e. said portions may be removed chemically by e.g. subjecting (e.g. dipping) the metal based component to an acid etching away said portions.

According to second aspect of the present inventive concept, a metal based component having a coated cavity is provided. The metal based component comprises a body formed by a single segment or a plurality of segments arranged in a stack, said body having an envelope comprising an opening fluidly connected to said cavity, and having internal wall portions defining said cavity, wherein said plurality of segments have metallurgically bonded to each other during hot pressing process for a predetermined time at a predetermined pressure and a predetermined temperature, wherein said metal based component comprises metallurgical detectable traces of said plurality of segments, wherein said metallurgical detectable traces are formed by crystallographic mismatch at interfaces between different segments in said plurality of segments.

Hereby, a strong metal based component with a high density and with relatively low residual stresses, having a cavity, can be provided, in which a hot pressing process, or a HIPping process, for a predetermined time at a predetermined pressure and a predetermined temperature, has been used to metallurgically bond the plurality of segments to form said metal based component.

According to at least one example embodiment, the metallurgical detectable traces are significant of the bonding of different segments of said plurality of segments during the hot pressing process (e.g. HIPping process), i.e. during the process of a hot pressing for a predetermined time at a predetermined pressure and a predetermined temperature. For example, the former interface between two segments, each one of the segments being e.g. a sheet or a plate or a foil, may be traced as the trace appears as a straight line, along which line metal grains is arranged. Hence, the term trace may be interpreted as the traceable formation of residues or residuals of the former interfaces.

According to at least one example embodiment of the invention the traces mentioned above is made visible through etching of a cross-sectional sample of the metal based component.

According to at least one example embodiment, said metal based component with or without a cavity has been formed by arranging said plurality of segments in a stack. The segments may be arranged in such a way that the shape of said stack corresponds to, or are the same as, the shape of the metal based component, and optionally such that a void is formed in said stack, wherein the shape and dimensions of at least a portion of said void corresponds to, or are the same as, the shape and dimensions of said cavity, and wherein at least said portion of the void has been filled with an incompressible filler, and which incompressible filler subsequent to the hot pressing process step have been at least partly removed from said cavity.

Alternatively, the metal based component may be arranged in a canister which is filled with a diamond powder, so the outer surface of said metal based component which is to be coated is exposed to said diamond powder. Here, the cavity may be formed by the inside surface of said canister together with the surface of said metal based component.

According to at least one example embodiment, the cavity is to at least 70%, or to at least 80%, or to at least 90% covered or defined by said internal wall portions of the metal based component. Typically, the internal wall portions face inwards of metal based component.

According to at least one example embodiment, said flow channel comprises at least one bend, or at least two bends, or at least three bends.

Hereby, the cavity of said metal based component may have a continuous curvature, and possibly a relatively complex shape.

According to at least one example embodiment, the cavity comprises a portion with a relatively small cross sectional area, and a portion with a relatively large cross sectional area. According to at least one example embodiment, said portion with a relatively large cross sectional area is interposed between two portions having a relatively small cross sectional area. Such geometrical configurations are typically difficult to achieve with standard manufacturing technologies.

According to at least one example embodiment, a surface of said internal wall portions of the body comprises traces, or residues, of an incompressible filler.

According to at least one example embodiment, said incompressible filler comprising at least diamond powder. In other words, diamond powder particles, or traces of diamond powder particles, will be embedded in the surface of said internal wall portions or will be embedded in said inner and/or outer surface portion of said metal based component. The effects, features and embodiments of the diamond powder are analogous to the diamond powder of the first aspect of the present invention and are not repeated again here. According to at least one example embodiment, said incompressible filler consists of diamond powder According to at least one example embodiment, the metal based component according to the second aspect of the present inventive concept has been manufactured or coated by the method according to the first aspect of the inventive concept.

Effects and features of this embodiment of the second aspect of the present inventive concept are thus largely analogous to those described above in connection with the first aspect of the inventive concept. Embodiments mentioned in relation to the first aspect of the present inventive concept are largely compatible with this embodiment of the second aspect of the inventive concept.

According to a third aspect of the present inventive concept, a metal based component is provided, which inner surface has been diamond coated. The metal based component has preferably been coated by the method according to the first aspect of the inventive concept.

Effects and features of this third aspect of the present inventive concept are thus largely analogous to those described above in connection with the first aspect of the inventive concept. Embodiments mentioned in relation to the first aspect of the present inventive concept are largely compatible with the third aspect of the inventive concept.

According to at least one example embodiment of the second or third aspect of the present inventive concept, said inner and or outer surface portions or said internal wall portions of said metal based component, or the inside or the internal surface of the metal tube or metal foil, is coated with a metal carbide layer, such as an Iron Carbide layer. Hence, the inner and or outer surface portions the internal surface, or the internal wall portions, of said metal based component, which partly or fully defines said cavity, is at least partly covered, or is coated, with a metal carbide layer. Such metal carbide layer is typically hard, and thus the internal wall portions of said cavity are more wear-resistant.

According to at least one example embodiment of the second or third aspect of the present inventive concept, the metal based component is a manifold, e.g. in which the cavity comprises a large pipe portion which is divided into a plurality of smaller pipe portions, or a reducer e.g. in which a relatively large portion of the cavity (i.e. having a relatively large cross sectional area) extends into a relatively small portion of the cavity (i.e. having a relatively small cross sectional area), or a fluid diode e.g. with a relatively complex geometry of the cavity. For example, the cavity may have a varying cross section alternating between relatively small cross sections and relatively larger cross sections. The metal based component may be a blind-tee, a wye-pipe, an impeller, a compressor, a pump, a housing, a cyclone, a diaphragm, a reactor, a stirrer, a stirring stick, a paddle, a fluid transporting, or fluid holding, component in which the cavity is e.g. a flow channel for transporting fluid, or a reservoir for holding fluid, respectively. For example, the metal based component may be at least one of the following: a tube, a duct, a tee-pipe, a wye-pipe, a manifold, a U-bend, an elbow, a reducer, an expander, a nozzle, a branch, a reservoir, a spiral, a cruciform, a fluid diode, a valve.

According to a fourth aspect, use of an incompressible filler comprising diamond powder when manufacturing and/or coating a metal based component optionally having a cavity is provided. The incompressible filler may be used in a cavity to maintain the desired shaped of said cavity during manufacturing of said metal based component by a hot pressing process. The metal based component has been manufactured by the method according to the first aspect of the inventive concept.

Effects and features of this fourth aspect of the present inventive concept are thus largely analogous to those described above in connection with the first aspect of the inventive concept. Embodiments mentioned in relation to the first aspect of the present inventive concept are largely compatible with the third aspect of the inventive concept. The metal based component may be the metal based component of said third aspect of the present inventive concept.

Thus, for example, said incompressible filler comprising, or consist of, diamond powder. In other words, use of diamond powder when manufacturing and/or coating a metal based component having a cavity is provided. The effects, features and embodiments of the diamond powder are analogous to the diamond powder of the first aspect of the present invention and are not repeated again here.

For example, said incompressible filler further comprises a solid insert, or a solid metal insert. The effects, features and embodiments of the solid insert, and the solid metal insert are analogous to the solid insert, and the solid metal insert of the first aspect of the present invention and are not repeated again here.

BRIEF DESCRIPTION OF THE DRAWINGS

The above objects, as well as additional objects, features and advantages of the present inventive concept, will be more fully appreciated by reference to the following illustrative and non-limiting detailed description of embodiments of the present invention, when taken in conjunction with the accompanying drawings, wherein:

FIG. 1a schematically shows the filling of an metal based component which inner surface is to be coated.

FIG. 1b schematically shows the removal of imcompressible coating material from the metal based component shown in FIG. 1a.

DETAILED DESCRIPTION OF THE DRAWINGS

Figure 2A:
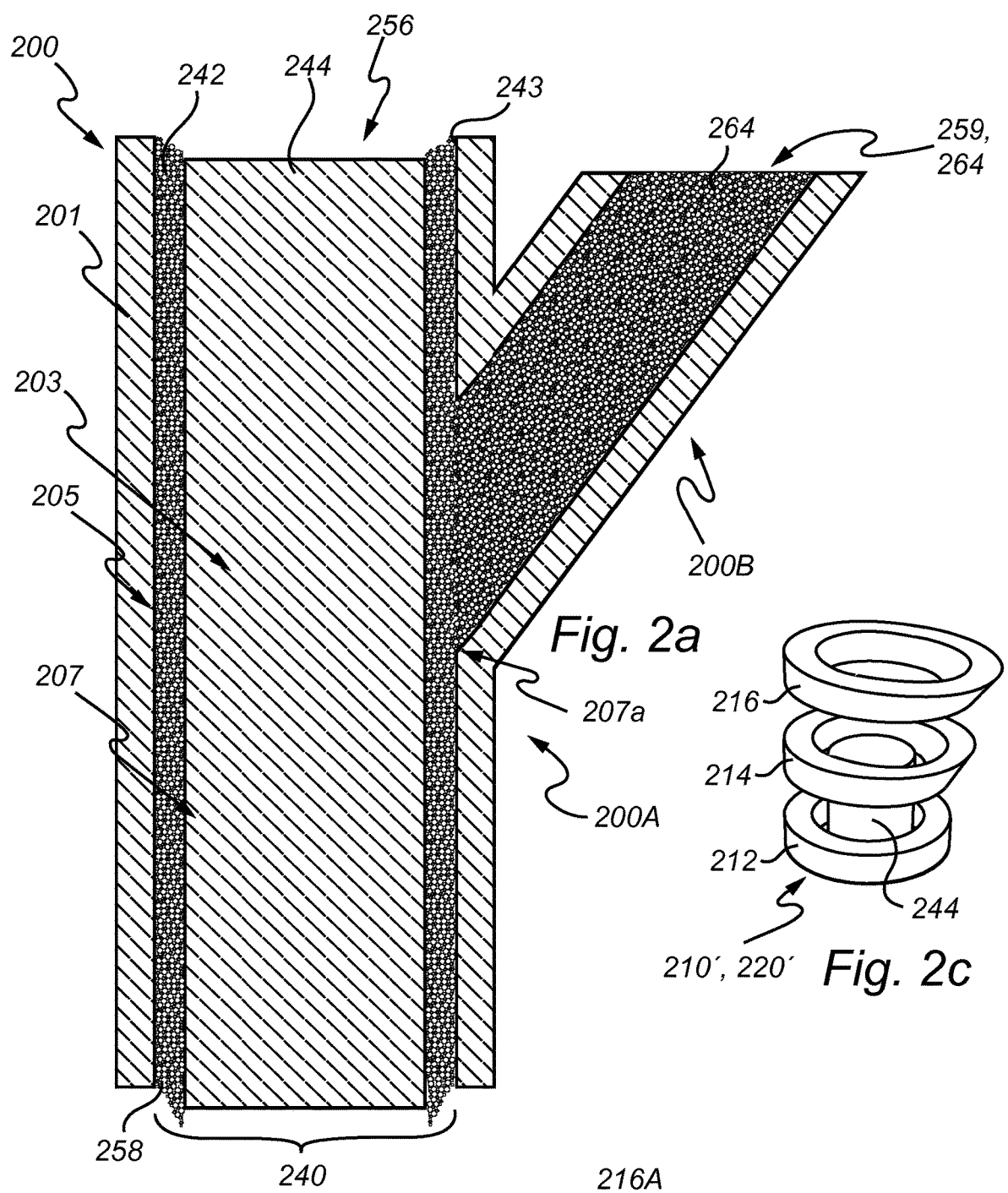
FIG. 2a schematically shows a cross section of a metal based component comprising a body and a cavity formed in the body.

In the present detailed description, embodiments of the present invention will be discussed with reference to the accompanying figures. It should be noted that this by no means limits the scope of the invention, which is also applicable in other circumstances for instance with other types or variants of methods for diamond coating a metal based component having a cavity encompassed by the scope of the claims, then the embodiments shown in the appended drawings. Further, that specific features are mentioned in connection to an embodiment of the invention does not mean that those features cannot be used to an advantage together with other embodiments of the invention.

FIG. 1a shows a schematic view of a one metal based component 120, which the inner surface 140 is to be coated. The metal based component may e.g. be made of a wrought material, and the outer layer of the inner surface comprises carbide forming composition. The inside surface 140 of said metal based component 120 forms a cavity, and the cross-section of said cavity is circular. The metal based component is a hollow body component, and more specifically a tubular component having a circular crossection.

The metal based component comprises a cavity having an opening which is configured to enable a fluid to enter said cavity. As shown in FIG. 1a, a coating material 180, and more specifically an incompressible coating material 180, is provided, and may be poured into the cavity 140 via the opening to fill the cavity 140. The incompressible filler 180 in FIG. 1a is a powder, and more specifically a diamond powder. The diamond powder may e.g. have an average powder size of between 1 micron and 1000 microns, preferably between 50 microns and 500 microns.

Prior to subjecting the stack to a hot pressing process, as is described further below, any openings in said metal based component are closed from the surroundings by at least a first closing member such as a cap, and the metal based component may be put in a canister and the subsequently subjecting the canister to the predetermined pressure and the predetermined temperature for the predetermined time.

During the hot pressing process, the shape and dimensions of the cavity 140, which is filled with the incompressible filler 180 is preferably maintained.

As illustrated in FIG. 1b, after the hot pressing process, the incompressible filler 180 is at least partly removed from the cavity 140, which is enabled by that at least one closing member is removed from the metal based component. As indicated by the gathering of the diamond powder in a tube 190, the diamond powder 140 may be collected and possibly be reused.

According to at least one example embodiment, the internal wall portions 140 are coated with a metal carbide layer, such as an Iron Carbide layer. Such metal carbide layer may e.g. origin from a reaction between diamond powder particles and internal segment wall portions, or an internal surface of the metal tube 105.

Turning to FIG. 2a showing a cross section of a metal based component 200 comprising a body 201 and a cavity 203 formed in the body 201. The metal based component 200 has been coated in a similar manner as the metal based component 100 of FIG. 1b. Thus, in short, and with reference to FIG. 2d, the body 201 of the metal based component 200 has been manufactured by a plurality of segments 210 arranged in a stack 220, wherein the plurality of segments 210 have metallurgically bonded to each other during a hot pressing process for a predetermined time at a predetermined pressure and a predetermined temperature. Below the terms void and cavity is used interchangeably.

Figure 2C:
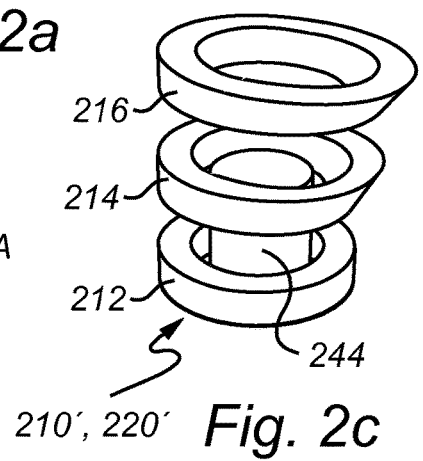
FIG. 2c schematically shows a subset of a plurality of segments.
Figure 2B:
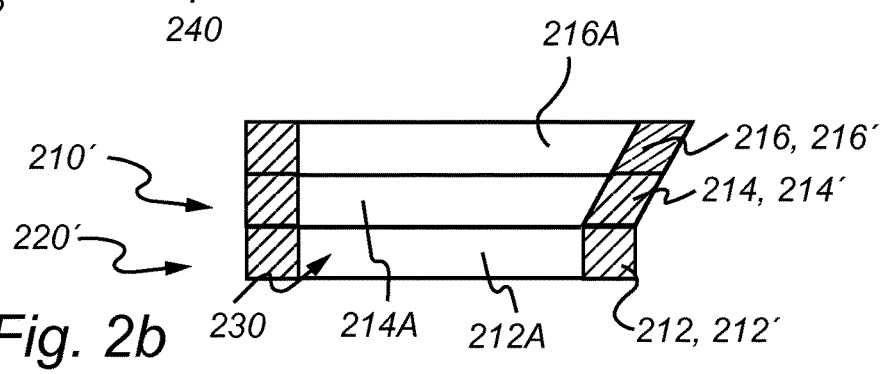
FIG. 2b schematically shows a cross section of a subset of a plurality of segments.
Figure 2D:
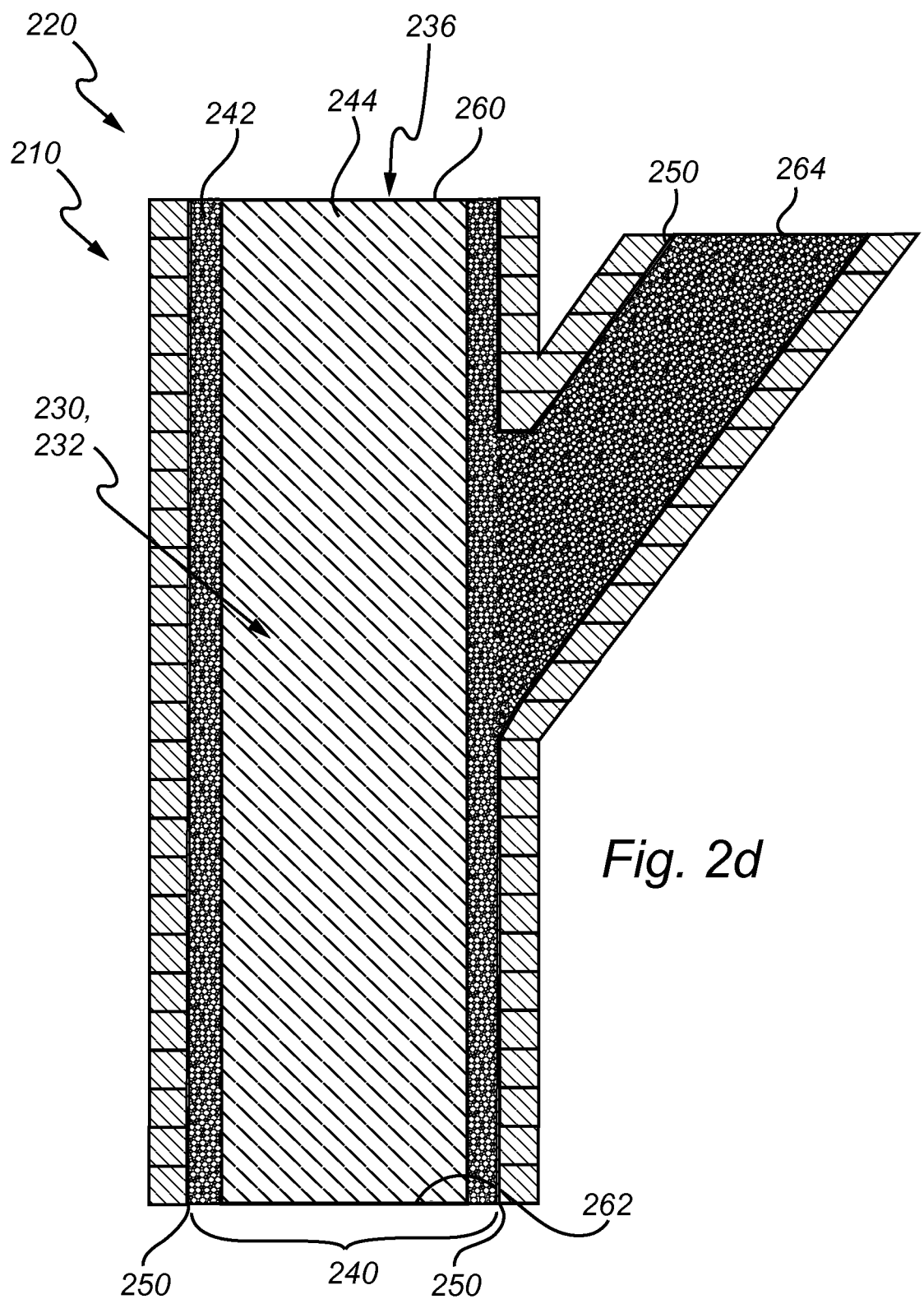
FIG. 2d schematically shows a cross section of a metal based component comprising a body that has been manufactured by a plurality of segments arranged in a stack.

In FIG. 2b and FIG. 2c, only a sub-set 210' of the plurality of segments 210 of FIG. 2d is shown, and more specifically, three segments 212, 214, 216, wherein each one of the three segments 212, 214, 216 comprises a through hole 212A, 214A, 216A. The three segments 212, 214, 216 are arranged in such a way that a stack 220' is formed, and such that the through holes 212A, 214A, 216A align. The aligned through holes 212A, 214A, 216A thus form at least a part of a void or cavity 230 (of which only a part of the void 230 is shown in FIG. 2b and FIG. 2c, complete void is shown in FIG. 2d, but in FIG. 2d). As mentioned above, FIG. 2b and FIG. 2c only discloses a sub-set 210' of the plurality of segments 210 used for manufacturing the metal based component 200 of FIG. 2a, thus more segments than the three segments 212, 214, 216 with a respective through hole are typically used for manufacturing the metal based component 200 of FIG. 2a, however the stacking principle, and the alignment of the through holes for forming the void 230, are equivalent to the shown three segments 212, 214, 216 of FIG. 2b, and FIG. 2c. Such configuration of a stack 210 is shown in FIG. 2d.

In FIG. 2d, the void 230 is not divided in the same way as the void 130 of FIG. 1a, and the void 230 consists of the portion 232 of the void housing the incompressible filler 240. As also shown in FIG. 2d a filler material 240, and more specifically an incompressible filler 240, is arranged in the void 230 to fill the void 230. The incompressible filler 240 in FIG. 2d comprises a powder 242, such as a diamond powder 242 as described with reference to FIG. 1a, and a solid insert 244, such as a solid metal insert 244, The diamond powder may e.g. have an average powder size of between 1 micron and 1000 microns, preferably between 50 microns and 500 microns. As shown in FIG. 2d, the solid metal insert 244 is embedded in the diamond powder 242, such that the solid metal insert 244 is prevented from being in contact with any one of the plurality of segments 210. Hereby bonding between any one of the plurality of segments 210 and the solid metal insert 244 during the hot pressing process is prevented. Moreover, as shown in FIG. 2d, a metal foil 250 is arranged inside of the void 230 between the plurality of segments 210 and the incompressible filler 240. Thus, contact between the plurality of segments 210 and the incompressible filler 240 is prevented. In more detail, the metal foil 250 is arranged between the diamond powder 242 and internal segment wall portions. Thus, the diamond powder 242 is prevented from undesirably entering any gaps or spaces within the stack 220; and the amount of diamond particles bonding to the foil may be regulated by a choice of material for the foil. In other words, the density of the diamond particles bonding to the foil may be higher lower or substantially the same as the density of diamond particles adhering to the segments when no foil is provided.

During the hot pressing process, similar to that described with reference to FIGS. 1a-1b, the shape and dimensions of the void 230, which is filled with the incompressible filler 240, 242, 244 will be maintained. Hereby, the void 230 holding the incompressible filler 240, 242, 244 will form the cavity 203 of the metal based component 200 in a desired manner. That is, the shape and dimensions of the cavity 203 will be the same, or substantially the same as, (i.e. will correspond to) the shape and dimensions of the void 230. Correspondingly, the body 201 of the metal based component 200 has been formed by the stack 220 of FIG. 2d, during the hot pressing process for a predetermined time at a predetermined pressure and a predetermined temperature wherein the plurality of segments 210 has metallurgically bonded to each other. Hence, each one of the plurality of segments 210 is typically metal based, and is e.g. made out of a wrought material. Stated differently, the plurality of segments 210 of FIG. 2d and are arranged in the stack 220 such that the stack 220, or the shape of the stack 220, corresponds to the body 201 of the metal based component 200, or the shape of the body 201 of the metal based component 200. Thus, the plurality of segments 210 corresponds to different portions of the body 201 of the metal based component 200.

Turning back to FIG. 2a, the metal based component 200 comprises a first elongated portion 200A, and a second elongated portion 200B, wherein the second elongated portion 200B is branched with an angle to the first elongated portion 200A thus forming the metal based component in a y-shape having at least one bend 207A. The body 201 is in common for the first elongated portion 200A and the second elongated portion 200B. Furthermore, as the body 201 comprises the cavity 203, also the cavity will be y-shaped corresponding to the shaped of the first elongated portion 200A and the second elongated portion 200B. Moreover, a first body opening 256, a second body opening 258, and a third body opening 259 are formed in the envelope of the body 201. All of the body openings 256, 258, 259 corresponds to respective openings in the stack 220, and have been closed by a first, second and third closing arrangement 260, 262, 264 respectively during the hot pressing process.

As shown in FIG. 2a, the second closing arrangement 262 has been removed, and thus the cavity 203 is opened to the surroundings, and the compressible filler 240 is, i.e. the diamond powder 242 and the solid metal insert 244 are, being removed from the cavity 203 via the second body opening 258. When the incompressible filler 240 has been removed, all of the first, second and third body openings 256, 258, 259 will be in fluid contact with each other, and the cavity 203, thus forming a flow channel 207 which is y-shaped within the body 201.

The cavity 203 is defined at least partly by internal wall portions 205, and is, in FIG. 2a, defined at least partly by the first, second and third body openings 256, 258, 259. The internal wall portions 205 defining the cavity will stem from the metal foil 250, as the metal foil 250 has been metallurgically bonded to the plurality of segments 210 during the hot pressing process. As a trace or as a residue, a surface of the internal wall portions 205 of the body 201 comprises diamond powder particles 243 which is embedded in the surface of the internal wall portions 205.

According to at least one example embodiment, the internal wall portions 205 are coated with a metal carbide layer, such as an Iron Carbide layer. Such metal carbide layer may e.g. origin from a reaction between diamond powder particles and internal segment wall portions, or a surface of the metal foil 250.

According to one example, the metal insert may be coated simultaneously as the inner surface of the segments. The only requirement is that the outer layer of the surface portion that is to be coated comprises a carbide forming composition. In other words, to coat an outer surface of an object it is arranged in a receptacle or canister which may hold the diamond powder, and according to this example the stack of segments may serve as such a receptacle.

Figure 3:
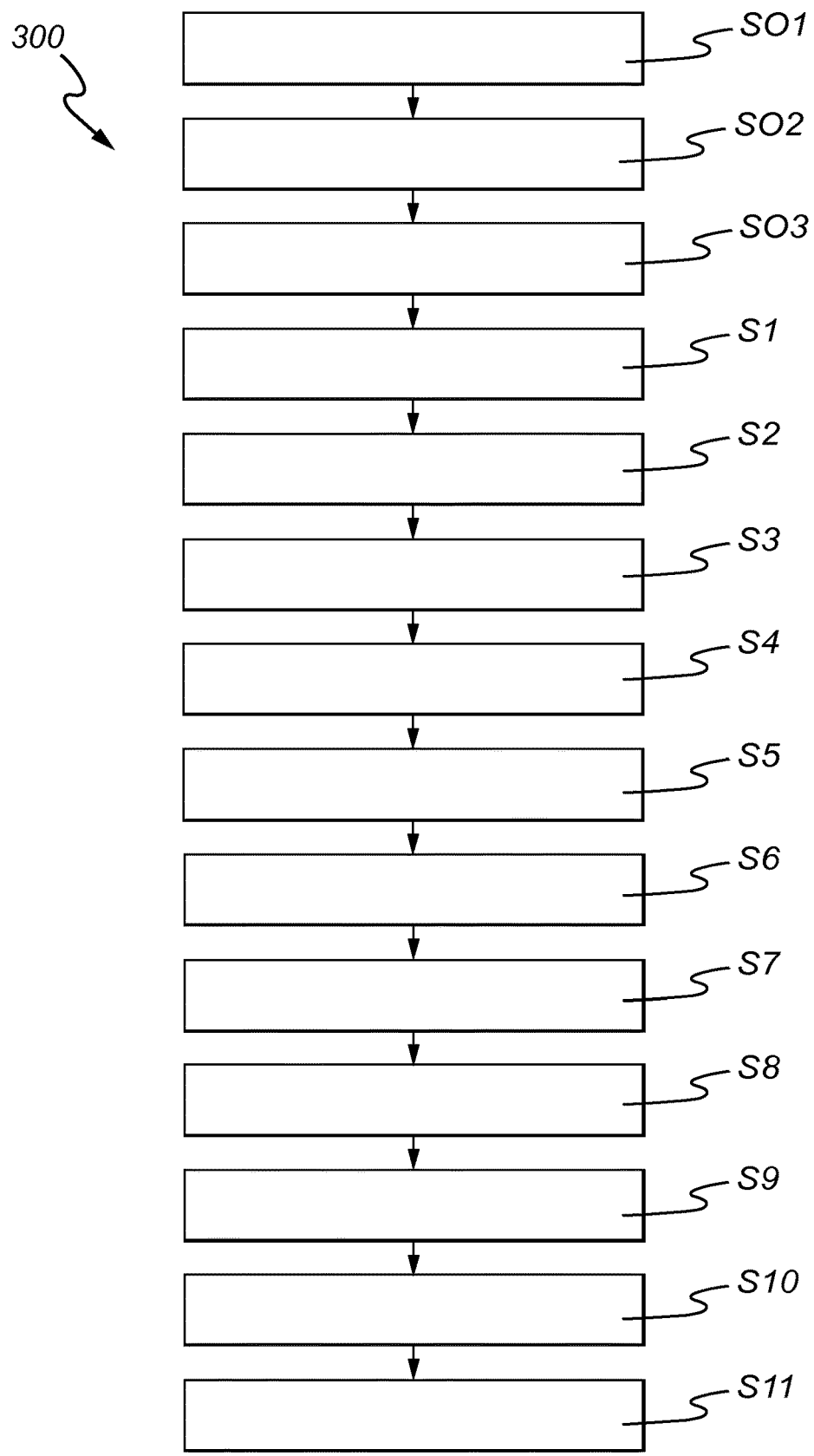
FIG. 3 shows a flow chart of the steps in a method for coating a metal based component having an inner and/or outer surface, according to at least one embodiment of the inventive concept.

Turning to FIG. 3 showing a flow chart of the steps in a method 300 for coating a metal based component 100, 200 having an inner and/or outer surface, according to at least one embodiment of the inventive concept. The metal based components 120 of FIG. 1b and FIG. 2a are examples of the result of the method described in relation to FIG. 3. However, only reference numerals used to describe structures and features in FIGS. 2a-2d will used when describing the method 300 of FIG. 3.

The method 300 comprises the steps of (steps are abbreviated with the capital "S"):

S1: providing a one or a plurality of segments 210 corresponding to different portions of the metal based component 200;

S2: optionally arranging the plurality of segments 210 in a stack 120, 220 in such a way that the shape of the stack 220 corresponds to, or are the same as, the shape of the metal based component 200. Further S3: optionally arranging a metal foil 250 inside of the void 230 such that the metal foil 250 prevents contact between the segments 210 and the incompressible filler 240.

S4: providing a cavity, wherein the surface of said metal based component that is to be coated forms at least a part of said cavity wall;

It should be noted that steps S2 and S2 are optional. However, the void or cavity 230 may be a single void 230 of the stack 220, or the void 130 may be divided into at least two portions.

S5: filling a first portion of the void, or filling the void 230 with an incompressible filler 240;

In step S5, for embodiments in which the incompressible filler 240 comprises a diamond powder 242 and a solid metal insert 244, the step S5 comprises embedding the solid metal insert 244 in the diamond powder 242.

It should be noted that the step S2 of arranging the plurality of segments 210 in a stack 220 may comprise arranging the segments 210 such that an opening 236 to the void 230 is formed in the envelope of the stack 210, and that the step S5 of filling at least the first portion of the void or filling the void 230, with an incompressible filler 240 comprises introducing the incompressible filler 240 to the first portion of the void, or the void 230, via at least one opening 236. The method may further comprise the step of S6: closing at least the first portion of the void, or closing the void 230, from the surroundings by closing at least a portion of the opening 236.

S7: removing gas from the stack 220 or the interface between the diamond and the surface to be coated;

S8: subjecting the stack 220 or metal based component a hot pressing process for a predetermined time at a predetermined pressure and a predetermined temperature such that the segments 210 bond metallurgically to each other to form the metal based component 100, 200 comprising the cavity 103, 203; and the diamond particles bond to the surface to be coated;

S9: opening the cavity 203 of the metal based component 100, 200 to the surroundings.

S10: removing at least a part of the incompressible filler 140, 240 from the metal based component 200.

In step S10, for embodiments in which the incompressible filler comprises diamond powder 242, the step S10 comprises removing at least a part of the diamond powder 242 from the metal based component 200.

S11: at least partly reusing the incompressible filler 240 subsequent to the step S10 of removing the incompressible filler 240 from metal based component 200.

Figure 4:
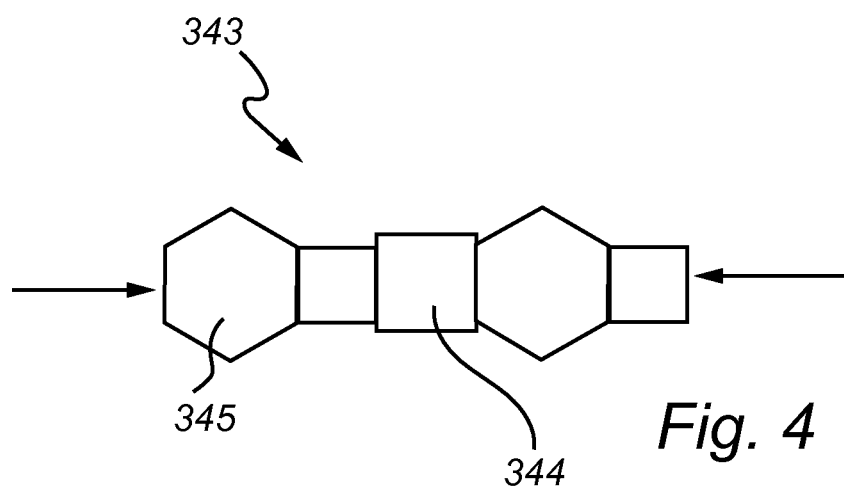
FIG. 4 shows a schematic, top view of at least some diamond powder particles of the diamond powder, as the diamond powder is arranged in the first portion of the void (i.e. the first void portion) or in the void.

The method 300 may further comprise the following three steps prior to the step S1 of providing a plurality of segments 210:

Turning to FIG. 4 showing a schematic, top view of at least some diamond powder particles 343 of the diamond powder 142, 242, as the diamond powder 142, 242 is arranged in the first portion 132 of the void 130 (i.e. the first void portion 132) or in the void 230. As seen in FIG. 4, the diamond powder particles 343 are formed in well-defined shapes as squares 344 and hexagons 345 with crystal facets having straight edges. The crystal facets of different diamond powder particles 343 are in contact with each other, and thus withstand compression when being subject to an external load (indicated by arrows in FIG. 4), such as an external load stemming from the hot pressing process and the predetermined pressure.

Figure 5:
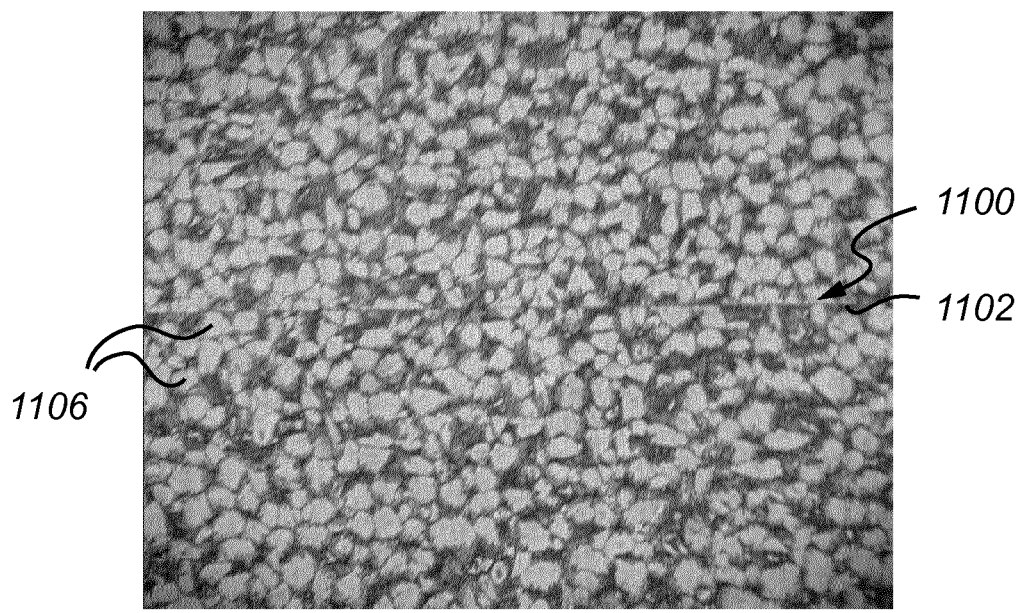
FIG. 5 shows a micrograph of a trace, e.g. a metallurgical detectable trace, of the interface between two different segments in the plurality of segments.

FIG. 5 shows a micrograph of a trace 1100, e.g. a metallurgical detectable trace, of the interface between two different segments in the plurality of segments 210, which trace is visible in the metal based component 200 after it is manufactured by the hot pressing process. In the micrograph, the line 1102, along which line a crystallographic mismatch of metal grains 1106 is clearly visible. Thus, the traces are formed by crystallographic mismatch at interfaces between different segments in the plurality of segments 210.

FIGS. 6a, 6b, 6c and 6d show different embodiments of metal based components 400, 500, 600, 700 formed in accordance with the method of the invention (as e.g. method 300 of FIG. 3) by a hot pressing process of stack (not shown) with a principle structure as the stacks 220 in FIGS. FIG. 2d but where the arrangement of the plurality of segments 210 have been arranged and stacked to correspond to the shape of the present metal based components 400, 500, 600, 700. Thus, an incompressible filler has been used in the formation of each one of the metal based components 400, 500, 600, 700 to form a respective cavity 403, 503, 603, 703 from a void, or a first void portion. Thus each one of the metal based components 400, 500, 600, 700 of FIGS. 6a, 6b, 6c and 6d, comprise a body 401, 501, 601, 701 formed by a plurality of segments arranged in a stack, wherein the plurality of segments have metallurgically bonded to each other during a hot pressing process (e.g. a HIPping process) for a predetermined time at a predetermined pressure and a predetermined temperature.

Figure 6A:
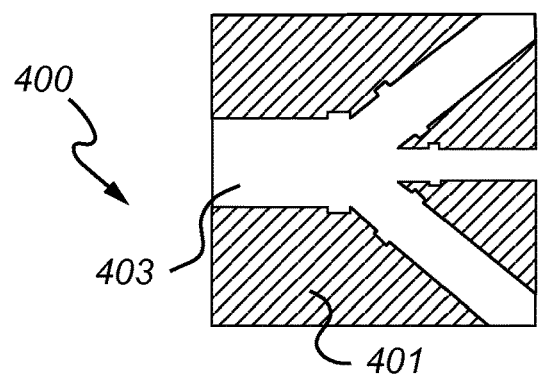
FIG. 6a schematically shows an embodiment of the metal-based component where it is a manifold in which the cavity comprises a large pipe portion which is divided into three smaller pipe portions formed in accordance with the method of the invention.
Figure 6B:
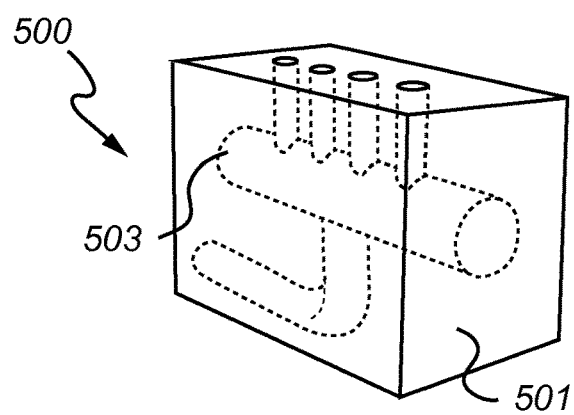
FIG. 6b schematically shows an embodiment of the metal-based component where it is a manifold in which the cavity comprises a relatively large pipe which ends into a common pipe from which four relatively small pipes extends formed in accordance with the method of the invention.
Figure 6C:
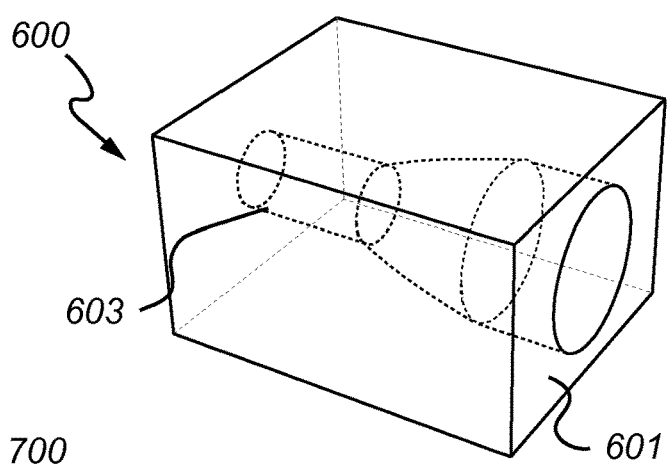
FIG. 6c schematically shows an embodiment of the metal-based component where it is a reducer in which a relatively large portion of the cavity (i.e. having a relatively large cross sectional area) extends into a relatively small portion of the cavity (i.e. having a relatively small cross sectional area) formed in accordance with the method of the invention.
Figure 6D:
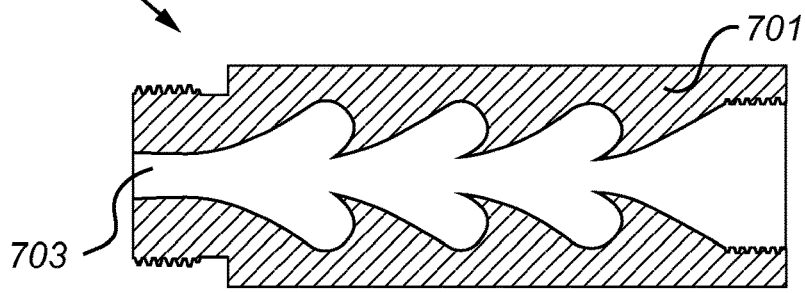
FIG. 6d schematically shows an embodiment of the metal-based component where it is a fluid diode with a relatively complex geometry of the cavity formed in accordance with the method of the invention.

In FIG. 6a the metal based component 400 is a manifold in which the cavity 403 comprises a large pipe portion which is divided into three smaller pipe portions. In FIG. 6b, the metal based component 500 is another manifold in which the cavity 503 comprises a relatively large pipe which ends into a common pipe from which four relatively small pipes extends. In FIG. 6c, the metal based component 600 is a reducer in which a relatively large portion of the cavity 603 (i.e. having a relatively large cross sectional area) extends into a relatively small portion of the cavity 603 (i.e. having a relatively small cross sectional area). In FIG. 6d, the metal based component 700 is a fluid diode with a relatively complex geometry of the cavity 703. For the fluid diode, the cavity has a varying cross section alternating between relatively small cross sections and relatively larger cross sections.

Figure 7:
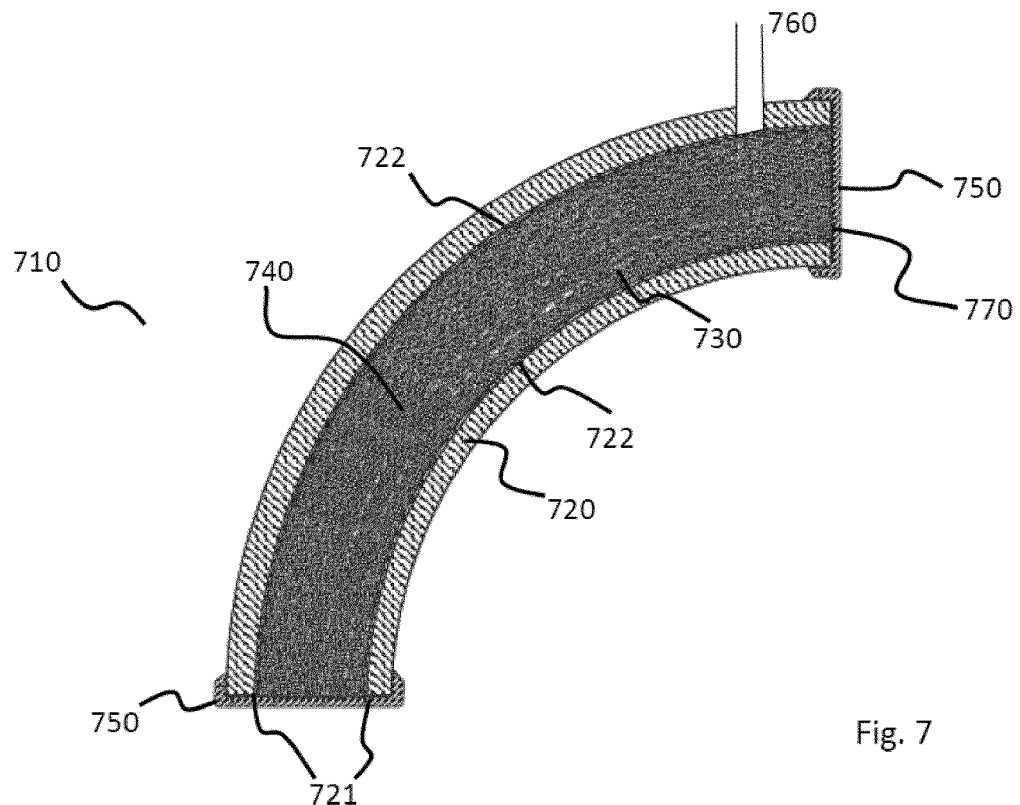
FIG. 7 schematically shows a cross sectional view of an embodiment of the inventive concept.

FIG. 7 shows a cross sectional view of an embodiment of the inventive concept 710. In this embodiment the inner surface of a one-piece metal component being tubular metal based component 720 with a tubular cavity 730 having a circular crossection is to be coated in accordance to at least one example embodiment of the invention. The surface portion to be coated is at least 90% or the entire inner surface of the cavity 721. The incompressible coating material, more specifically diamond powder 740 is provided into the cavity 730. In this example embodiment the carbide forming material 722 is provided as an interlayer or outerlayer at the interface between the inner surface 721 of the cavity 730, and the diamond powder 740 filling the cavity 730.

In order to provide for better vacuum, prior to the hot pressing process, both openings 770, are closed from the surroundings using a pair of closing members 750. Prior to subjecting the metal based component 720 to the hot pressing process, gas is preferably removed through the crimp tube 760, which is sealed off after gas removal. After the hot pressing process, one or both closing members are removed and the lose diamond powder is poured out.

Figure 8:
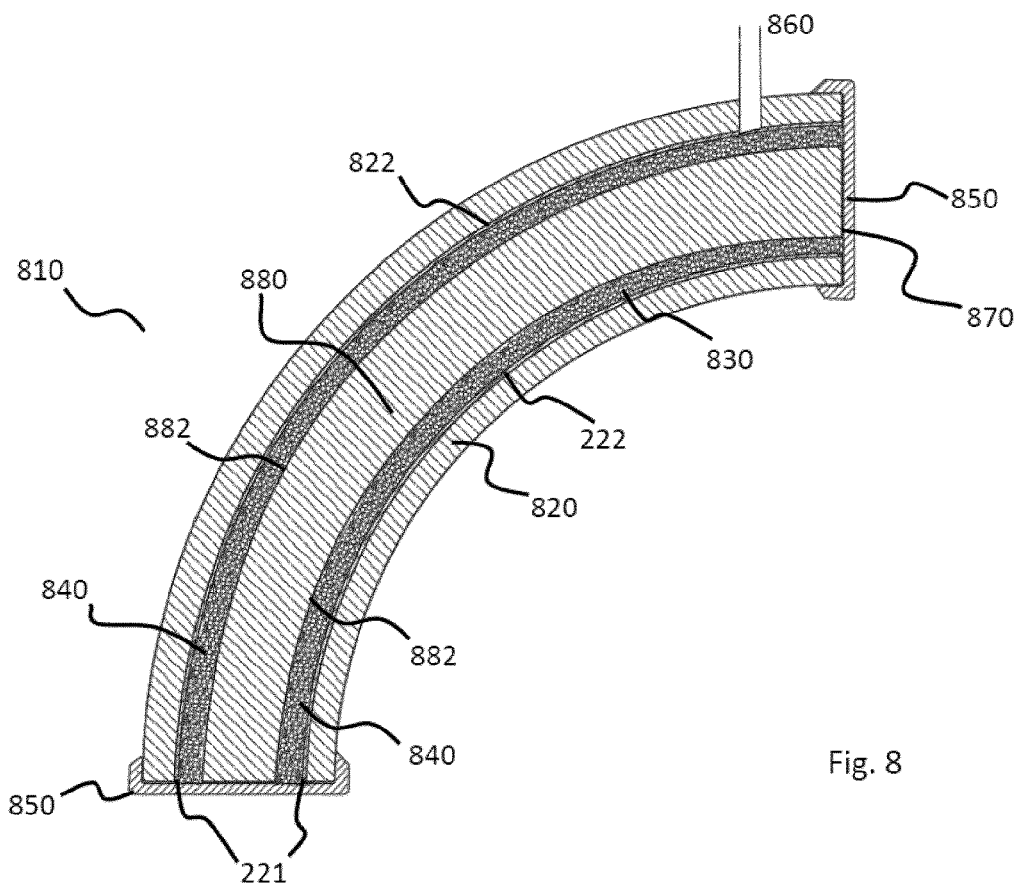
FIG. 8 schematically shows a cross sectional view of an example embodiment of the inventive concept.

FIG. 8 demonstrates a cross sectional view of an example embodiment 810 of the inventive concept, where a tubular metal based component like the one described in relation to FIG. 7 is to be coated in the same way as described in relation to FIG. 7, except that according to this example a filler metal insert 880 is provided within the cavity 830 of the tubular metal component 820, such that the diamond powder is filled in between the metal insert 880 and the inner surface 821 of the cavity 830. The metal insert 880 may serve as a filler in order to prevent excessive use of diamond powder 840. The metal insert 880 may alternatively be inserted into the cavity 830 in order to coat at least a surface portion of its outer surface 881 exposed to the diamond powder 840. Optionally, the whole or a portion of the outer surface 881 of the metal insert 880 may be composed of a carbide forming material or the carbide forming material be provided as an interlayer 882 at the interface between the outer metal insert surface 881 and the diamond powder 840, whereby this surface is also coated.

In the example embodiment demonstrated in FIG. 8, surface portions of both the metal insert 880 and the cavity 830 of the metal based component 820 may fully or at least partially be diamond coated through a hot pressing process.

Similar to the embodiment demonstrated in FIG. 7, prior to the hot pressing process the at least one opening 870 of the cavity 830 of the metal based component 820, is sealed off using a closing member 850. The gas is evacuated from the cavity 840 through the crimp tube 860, which is then sealed off.

Figures 9A, 9B:
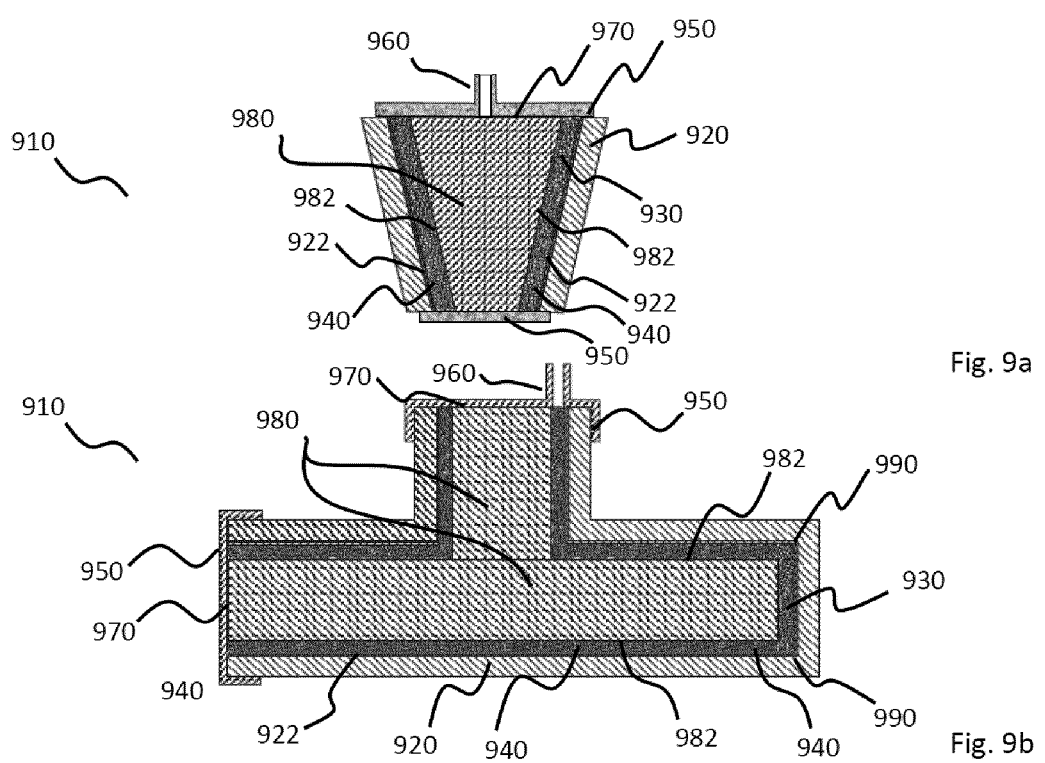
FIG. 9a schematically shows a cross sectional view of another example embodiment of the inventive concept, wherein a surface portion of the cavity of a metal based component is to be diamond coated.
FIG. 9b schematically shows a cross sectional view of another example embodiment of the inventive concept, wherein a surface portion of the cavity of a metal based component is to be diamond coated.

FIGS. 9a and 9b demonstrate cross sectional views of another example embodiments 910 of the inventive concept, wherein a surface portion of the cavity 930 of a metal based component 920 is to be diamond coated. The coating process are performed as described in relation to FIG. 8, except that in these example embodiments the cross sectional shape of the cavity 930 is a trapezium (FIG. 8a) or a "T" (FIG. 8b), and comprise of sharp corners 990 (FIG. 8b). In an orthogonal direction the cross-section is circular. The to be coated surface portion is the entirety of the inner side walls 921 of said cavity 930. A metal insert 980 is positioned within the cavity 930. The diamond powder 940 is located in between the void formed by the inner walls 921 of the cavity 930, and the metal insert 980 positioned within the cavity 930. A carbide forming interlayer 920 is provided at the interface.

Figure 10:
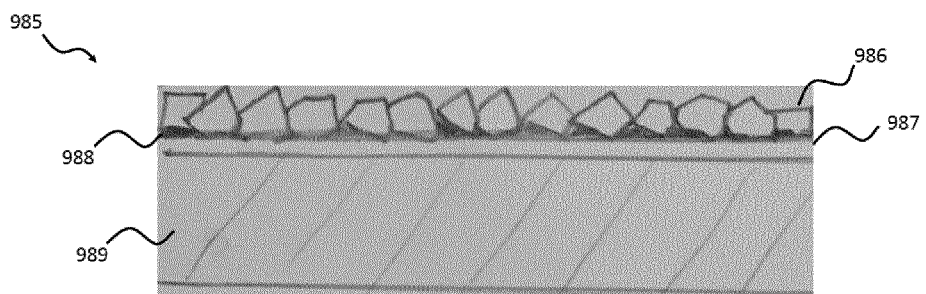
FIG. 10 schematically shows a cross sectional close up of the diamond coated surface of a diamond-coated metal-based component after the hot pressing process.

FIG. 10 demonstrates a cross sectional close up 985 of the diamond coated surface 989 of a diamond-coated metal-based component after the hot pressing process. The diamond grains 986 are observable on the surface, with their side facets tightly packed against one another. Upon the hot pressing process, the carbide forming layer 987 on the metal surface 989 fully or partly forms a metal carbide interlayer 988 which whereby said diamond grains 986 are bonded or diffusion bonded to the surface of said metal-based component. In other words, the diamond coating comprises at least a first and a second layer, said first layer comprising diamond grains 986, said second layer comprising a carbide interlayer 988 bonding said diamond grains to said metal-based component.

Figure 11:
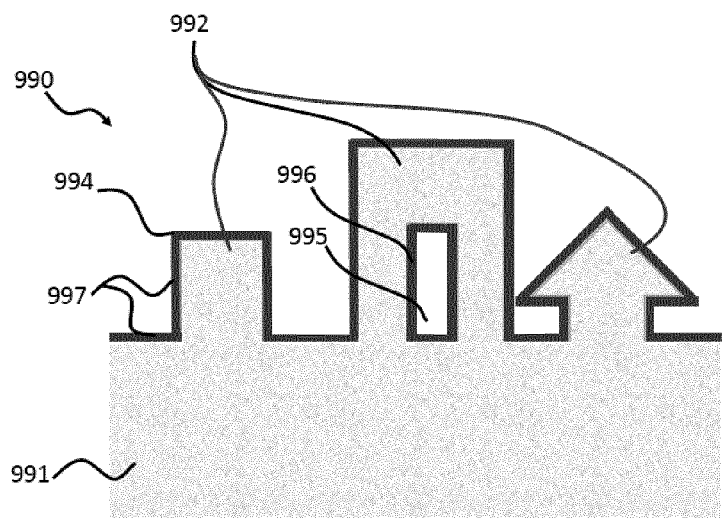
FIG. 11 schematically shows a cross sectional view of another embodiment of the inventive concept, wherein the outer surface of a metal component along with the outer surface of protruding metal portions are diamond coated using the present inventive concept.

FIG. 11 demonstrates a schematic cross sectional view of another embodiment 990 of the inventive concept, wherein the outer surface 997 of a metal component 991 along with the outer surface 997 of protruding metal portions 992 are diamond coated 994 using the present inventive concept. In addition, the inner surface 996 of cavity 995 is also diamond coated 994. In other words, the component was arranged in a casing or canister during the hot pressing process.

According to one example, there is provided a method for coating a metal based component surface wherein said metal based component has an inner and/or outer surface portion that is to be coated, and which surface portion comprises a carbide forming composition. A cavity having one or more cavity walls, wherein said at least one inner and/or outer surface portion forms at least a portion of said one or more cavity walls is provided, and a portion of the cavity is filled with diamond powder. Thereafter gas is removed from the interface between said diamond powder and said at least one inner and/or outer surface portion, and the cavity is subjected to a hot pressing process for a predetermined time at a predetermined pressure and a predetermined temperature such that said diamond powder diffusion bonds to said at least one one inner and/or outer surface portion. Finally at least a part of said diamond powder is removed from said at least one cavity.

The person skilled in the art realizes that the present invention by no means is limited to the embodiments described above. The features of the described embodiments may be combined in different ways, and many modifications and variations are possible within the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for coating a wrought metal based component surface said method comprising the steps of:
   providing a wrought metal based component having at least one inner and/or outer surface portion that is to be coated, which inner and/or outer surface portion comprises a carbide forming composition throughout said inner and/or outer surface portion;

providing at least one cavity having one or more cavity walls, wherein said at least one inner and/or outer surface portion forms at least a portion of said one or more cavity walls;

filling at least a portion of the at least one cavity with an incompressible coating material comprising diamond powder, such that said at least one inner and/or outer surface portion is exposed to said diamond powder;

removing gas from the interface between said incompressible coating material and said at least one inner and/or outer surface portion;

subjecting said at least partially filled at least one cavity to a hot pressing process for a predetermined time at a predetermined pressure and a predetermined temperature such that said diamond powder diffusion bonds to said at least one inner and/or outer surface portion; and removing at least a part of said incompressible coating material from said at least one cavity;

wherein the wrought metal based component surface comprises a diamond coating including at least a first layer deposited on a second layer, said first layer comprising diamond grains, said second layer comprising a carbide interlayer bonding said diamond grains to said wrought metal based component; and wherein:
  each diamond grain in the first layer is in touching contact with another diamond grain without bonding to another diamond grain; and/or
  said first layer comprising diamond grains in an amount of at least 70% by weight of the first layer, and each diamond grain in the first layer does not bond to another diamond grain.

2. The method according to claim 1, wherein said step of providing a wrought metal based component comprises providing a wrought metal based component which is a one-piece component, or a two-segment component, or a multi-segment component.

3. The method according to claim 1, wherein the carbide forming composition is selected from a group comprising Chromium, Titanium, Tungsten, Molybdenum, transitional metals and/or alloys thereof.

4. The method according to claim 1, wherein at least a portion of an outer surface of said wrought metal based component is to be coated and said cavity is partly formed by a casing enclosing said outer surface.

5. The method according to claim 1, wherein the average grain size of said diamond powder is at least 1 µm, or at least 10 µm, or at least 20 µm, or at least 30 µm and/or wherein the average grain size of said diamond powder is at most 1000 µm or at most 500 µm, or at most 250 µm, or at most 100 µm, or at most 50 µm, or at most 40 µm.

6. The method according to claim 1, wherein said step of removing at least a part of said incompressible coating material from said at least one cavity comprises removing at least a part of said diamond powder from said at least one cavity, which is not bonded to said surface portion of said at least one or more cavity wall.

7. The method according to claim 1, wherein the carbide forming layer has a thickness equivalent to the desired thickness of the final diamond coating layer.

8. The method according to claim 1, wherein wrought metal based component comprises two or more segments which segments metallurgically bond together during said hot pressing process.

9. The method according to claim 1, wherein the temperature range of said hot pressing process be within a suitable range, said range being preferably within 900-1300° C.

10. The method according to claim 1, wherein said wrought metal based component is a hollow body which inner surface and/or outer surface is to be fully or partly coated, wherein said hollow body is preferably tubular and optionally has an elliptical or rectangular cross-section.

11. The method according to claim 10, wherein at least one metal insert is positioned within said wrought metal based component such that the diamond powder is located between the inner surface of said hollow body and the at least one metal insert, wherein said metal insert is optionally at least one metal bar.

12. A diamond-coated wrought metal-based component, wherein said diamond coating comprises at least a first layer deposited on a second layer, said first layer comprising diamond grains, said second layer comprising a carbide interlayer bonding said diamond grains to said wrought metal-based component, wherein each diamond grain in the first layer is in touching contact with another diamond grain without bonding to another diamond grain.

13. The diamond-coated wrought metal-based component according to claim 12, wherein said diamond-coated wrought metal-based component comprises a cavity wherein the whole or at least a part of the surface of said cavity is diamond coated.

14. The diamond-coated wrought metal-based component according to claim 13, wherein at least a portion of said cavity is tubular, and wherein a cross-section of said tubular cavity surface is optionally elliptical or rectangular.

15. The diamond-coated wrought metal-based component according to claim 14, wherein the ratio between the length and the diameter of said tubular cavity is at least 1:5.

16. A diamond-coated wrought metal-based component, wherein said diamond coating comprises at least a first layer deposited on a second layer, said first layer comprising diamond grains in an amount of at least 70% by weight of the first layer, said second layer comprising a carbide interlayer bonding said diamond grains to said wrought metal-based component, wherein each diamond grain in the first layer is in touching contact with another diamond grain without bonding to another diamond grain.

17. The diamond-coated wrought metal-based component according to claim 16, wherein said first layer comprising diamond grains in an amount of at least 80% by weight of the first layer.

18. The diamond-coated wrought metal-based component according to claim 16, wherein said first layer comprising diamond grains in an amount of at least 90% by weight of the first layer.

19. The diamond-coated wrought metal-based component according to claim 16, wherein said first layer comprising diamond grains in an amount of at least 95% by weight of the first layer.

* * * * *